(12) United States Patent
Kano

(10) Patent No.: US 12,470,680 B2
(45) Date of Patent: Nov. 11, 2025

(54) ELECTRONIC DEVICE, METHOD FOR CONTROLLING ELECTRONIC DEVICE, AND NON-TRANSITORY COMPUTER-READABLE MEDIUM

(71) Applicant: CANON KABUSHIKI KAISHA, Tokyo (JP)

(72) Inventor: Akira Kano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/978,842

(22) Filed: Dec. 12, 2024

(65) Prior Publication Data

US 2025/0203054 A1 Jun. 19, 2025

(30) Foreign Application Priority Data

Dec. 14, 2023 (JP) ................. 2023-210898

(51) Int. Cl.
| | |
|---|---|
| *H04N 5/232* | (2006.01) |
| *H04N 13/128* | (2018.01) |
| *H04N 13/225* | (2018.01) |
| *H04N 13/296* | (2018.01) |
| *H04N 23/63* | (2023.01) |

(52) U.S. Cl.
CPC ......... *H04N 13/128* (2018.05); *H04N 13/225* (2018.05); *H04N 13/296* (2018.05); *H04N 23/635* (2023.01)

(58) Field of Classification Search
CPC .. H04N 13/128; H04N 13/225; H04N 13/296; H04N 23/635; H04N 13/218; H04N 23/633; H04N 23/698; H04N 23/64; H04N 23/671; H04N 23/672
See application file for complete search history.

(56) References Cited

U.S. PATENT DOCUMENTS

| | | | |
|---|---|---|---|
| 9,918,066 B2* | 3/2018 | Schneider | ............ H04N 13/117 |
| 9,948,923 B2* | 4/2018 | Inaba | ..................... G03B 35/00 |
| 10,075,700 B2* | 9/2018 | Blonde | .................... G06T 15/00 |
| 10,365,554 B1* | 7/2019 | McDowall | ......... A61B 1/00009 |
| 10,368,059 B2* | 7/2019 | Fateh | .................... H04N 13/327 |

(Continued)

FOREIGN PATENT DOCUMENTS

| | | |
|---|---|---|
| JP | 2001281754 A | 10/2001 |
| JP | 2010177921 A | 8/2010 |

(Continued)

*Primary Examiner* — Philip P. Dang
(74) *Attorney, Agent, or Firm* — Canon U.S.A., Inc. IP Division

(57) ABSTRACT

An electronic device includes: a processor; and a memory storing a program which, when executed by the processor, causes the electronic device to: execute acquisition processing to acquire information on a distance from an imaging device to an object; execute control processing to control notification of a relationship between a recommended distance and the distance from the imaging device to the object, the recommended distance representing a photographing distance that enables three-dimensional viewing of a captured image containing two image regions with parallax relative to each other; and execute setting processing to set whether to display information showing the relationship between the recommended distance and the distance from the imaging device to the object.

17 Claims, 12 Drawing Sheets

(56) References Cited

U.S. PATENT DOCUMENTS

| | | | |
|---|---|---|---|
| 10,455,215 B2* | 10/2019 | Doerre | H04N 13/344 |
| 10,506,151 B2* | 12/2019 | Yoshida | H04N 1/2125 |
| 10,516,824 B2* | 12/2019 | Jeon | H04N 23/51 |
| 10,819,912 B2* | 10/2020 | Jin | H04N 13/243 |
| 10,861,132 B2* | 12/2020 | You | H04L 65/70 |
| 10,866,425 B1* | 12/2020 | Price | G02B 27/017 |
| 11,006,048 B2* | 5/2021 | Yun | H04N 23/661 |
| 11,172,135 B2* | 11/2021 | Park | H04N 23/69 |
| 11,280,985 B2* | 3/2022 | Kainz | H04N 13/194 |
| 11,310,487 B1* | 4/2022 | Clemens | H04N 13/366 |
| 11,659,158 B1* | 5/2023 | Clemens | H04N 13/117 |
| | | | 345/419 |
| 11,809,622 B2* | 11/2023 | Song | G06T 11/00 |
| 2010/0315517 A1* | 12/2010 | Nakamura | H04N 13/189 |
| | | | 348/207.99 |
| 2017/0359562 A1* | 12/2017 | Schneider | H04N 13/117 |
| 2020/0267328 A1* | 8/2020 | Jeung | H04N 13/282 |
| 2020/0278602 A1* | 9/2020 | Rhee | G03B 31/06 |
| 2021/0168284 A1* | 6/2021 | Sjölund | H04N 13/243 |

FOREIGN PATENT DOCUMENTS

| | | |
|---|---|---|
| JP | 2014027390 A | 2/2014 |
| WO | 2012023168 A1 | 2/2012 |

* cited by examiner

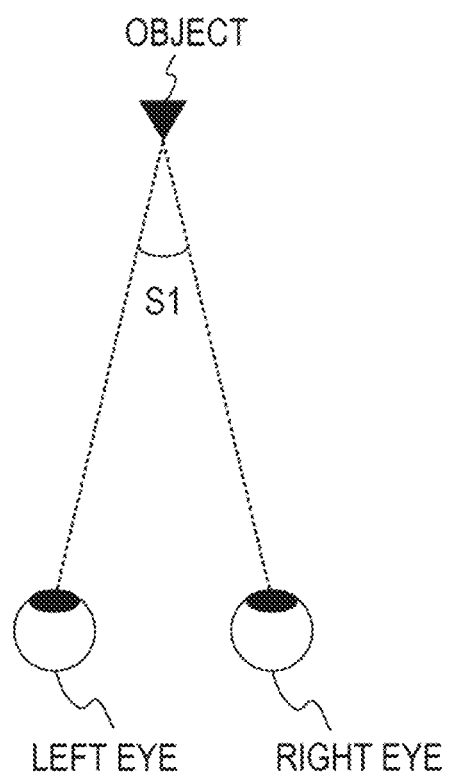
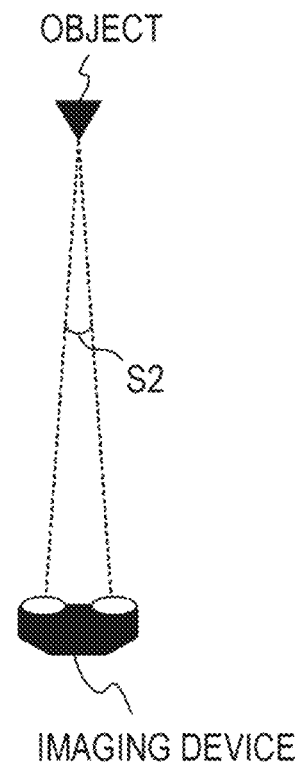
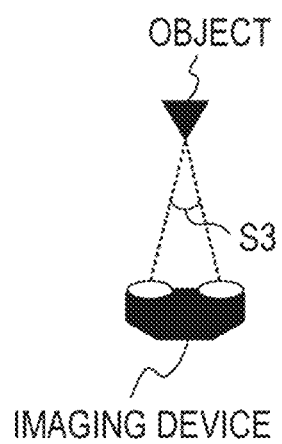
FIG. 1A
FIG. 1B
FIG. 1C

900

901  902  903

901  902  903

902  901  903

FIG. 12
| LENS ID | RECOMMENDED DISTANCE (SHORTEST) | RECOMMENDED DISTANCE (LONGEST) |
|---|---|---|
| 001 | x1 | x2 |
| 002 | y1 | y2 |
| 003 | z1 | z2 |
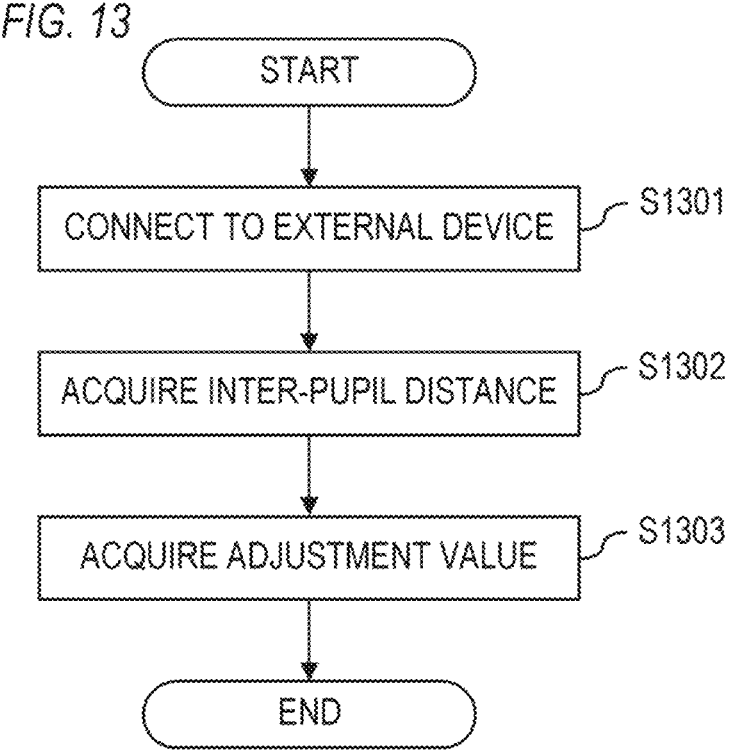
FIG. 13
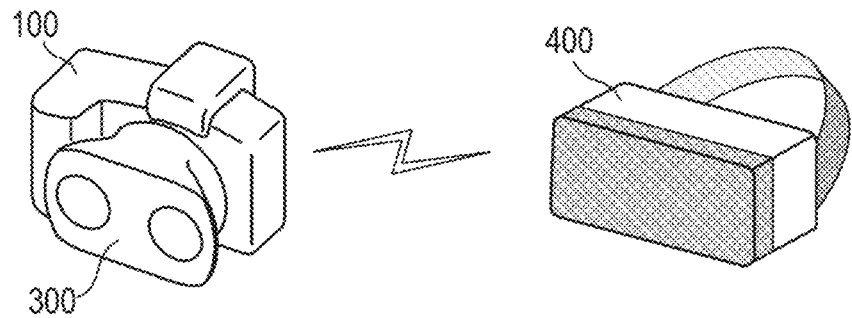
FIG. 14

ELECTRONIC DEVICE, METHOD FOR CONTROLLING ELECTRONIC DEVICE, AND NON-TRANSITORY COMPUTER-READABLE MEDIUM

BACKGROUND

Technical Field

The aspect of the embodiments relates to an electronic device, a method for controlling the electronic device, and non-transitory computer-readable medium.

Description of the Related Art

Technologies that acquire an image containing two image regions with parallax using two optical systems oriented in the same direction and display the two image regions to be viewable in three dimensions have been known. If a circumferential fish-eye lens is used for each optical system, it is possible to obtain an image region that shows a wide range of at least 180 degrees in both vertical and horizontal directions (a semi-sphere, 90 degrees in all directions from an image center) as each image region.

Japanese Patent Application Laid-open No. 2001-281754 discloses a camera capable of performing stereoscopic photographing, which is designed to capture the same object from different viewing points where the lines of sight are parallel to each other.

Japanese Patent Application Laid-open No. 2010-177921 discloses a three-dimensional imaging device that detects the corresponding points between a plurality of captured images obtained by capturing an object field from a plurality of viewing points.

SUMMARY

A first aspect of the embodiments is an electronic device including: a processor; and a memory storing a program which, when executed by the processor, causes the electronic device to: execute acquisition processing to acquire information on a distance from an imaging device to an object; execute control processing to control notification of a relationship between a recommended distance and the distance from the imaging device to the object, the recommended distance representing a photographing distance that enables three-dimensional viewing of a captured image containing two image regions with parallax relative to each other; and execute setting processing to set whether to display information showing the relationship between the recommended distance and the distance from the imaging device to the object.

A second aspect of the embodiments is a method for controlling an electronic device, the method comprising: acquiring information on a distance from an imaging device to an object; controlling notification of a relationship between a recommended distance and the distance from the imaging device to the object, the recommended distance representing a photographing distance that enables three-dimensional viewing of a captured image containing two image regions with parallax relative to each other; and setting whether to display information showing the relationship between the recommended distance and the distance from the imaging device to the object.

A third aspect of the embodiments is a non-transitory computer-readable medium storing a program, wherein the program causes a computer to execute a method for controlling an electronic device, the method comprising: acquiring information on a distance from an imaging device to an object; controlling notification of a relationship between a recommended distance and the distance from the imaging device to the object, the recommended distance representing a photographing distance that enables three-dimensional viewing of a captured image containing two image regions with parallax relative to each other; and setting whether to display information showing the relationship between the recommended distance and the distance from the imaging device to the object.

Further features of the present disclosure will become apparent from the following description of exemplary embodiments with reference to the attached drawings.

BRIEF DESCRIPTION OF THE DRAWINGS

FIG. 1A is a schematic view of the eyes of a user viewing an object;

FIGS. 1B and 1C are schematic views of an imaging device that captures the object;

FIG. 12 is a diagram illustrating a recommended distance information table;

FIG. 13 is a flowchart illustrating setting processing for an adjustment value according to the second embodiment;

FIG. 14 is a diagram describing the connection between a camera and an HMD according to the second embodiment;

DESCRIPTION OF THE EMBODIMENTS

First Embodiment

Figure 2A:
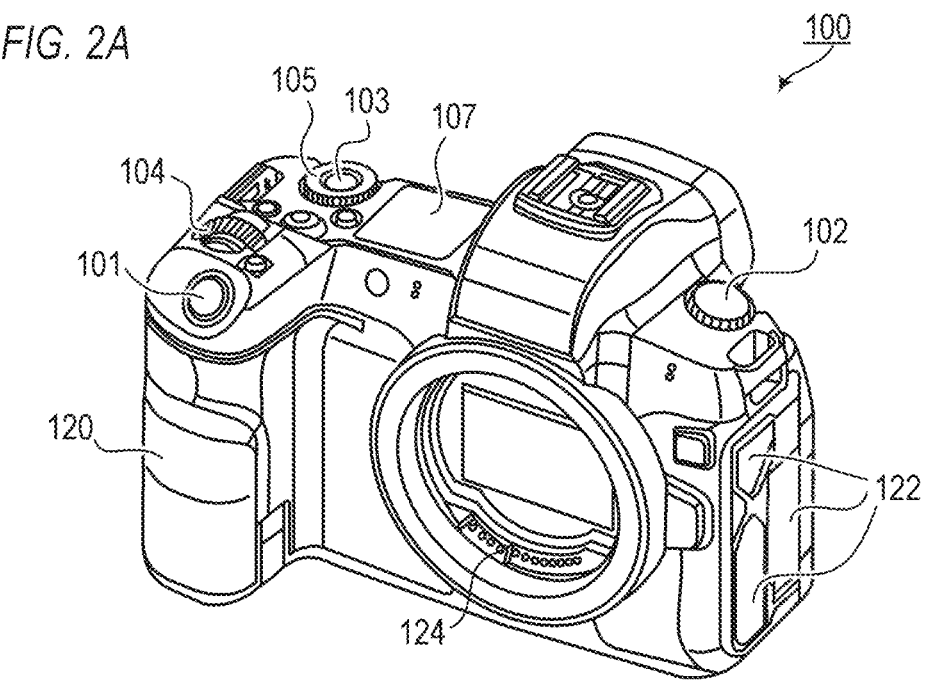
FIGS. 2A and 2B are appearance views of a camera.

Hereinafter, embodiments of the present disclosure will be described with reference to the drawings. FIGS. 1A to 1C are schematic views of the eyes of a user viewing an object and an imaging device capturing the object. With reference to FIGS. 1A to 1C, the reason why the three-dimensional effect perceived when the user views an image containing two image regions with parallax on a display device differs from the three-dimensional effect perceived when the user actually views the object will be described.

FIG. 1A is a schematic view of the user viewing the object with the left and right eyes. A convergence angle S1 represents the angle formed by the lines (lines of sight) connecting the object and the left and right eyes. FIG. 1B is a schematic view showing the object being captured by the imaging device with two optical systems. The distance from the imaging device to the object in FIG. 1B is the same as the distance from the user to the object in FIG. 1A. A convergence angle S2 represents the angle formed by the lines connecting the object and the optical systems on the left and right sides.

The distance between the left and right eyes differs from the distance between the two optical systems. Therefore, the convergence angle S1 differs from the convergence angle S2. In other words, the parallax between left and right image regions contained in an image captured by the imaging device differs from the parallax between the regions viewed by the user with the left and right eyes from the same position as the imaging device. When the convergence angle S2 is smaller than the convergence angle S1, the parallax becomes smaller in the case where the object is captured by the imaging device compared to the case where the user actually views the object. When the convergence angle S2 for imaging with the imaging device is smaller than the convergence angle S1, the three-dimensional effect perceived when viewing an image captured by the imaging device on the display device decreases. As described above, the three-dimensional effect perceived when the user views the object from the imaging position in FIG. 1A differs from the three-dimensional effect perceived when the user views the captured image on the display device such as a head-mounted display (HMD).

FIG. 1C is a schematic view of the object being captured by the imaging device from a position closer to the object than the position in FIG. 1B. A convergence angle S3 represents the angle formed by the lines connecting the object and the left and right optical systems. By bringing the imaging device closer to the object, the convergence angle S3 becomes approximately the same as the convergence angle S1 in FIG. 1A. The three-dimensional effect perceived when viewing an image captured by bringing the imaging device closer to the object on the display device becomes similar to the three-dimensional effect perceived when the user views the object from the imaging position in FIG. 1A.

In view of the above, an imaging device (camera) according to a first embodiment notifies a user of an appropriate distance to an object, enabling the user to capture images that are viewable in three dimensions. On the basis of the notification from the imaging device, the user is enabled to easily capture the images that are viewable in three dimensions by adjusting the distance to the object.

Figure 2B:
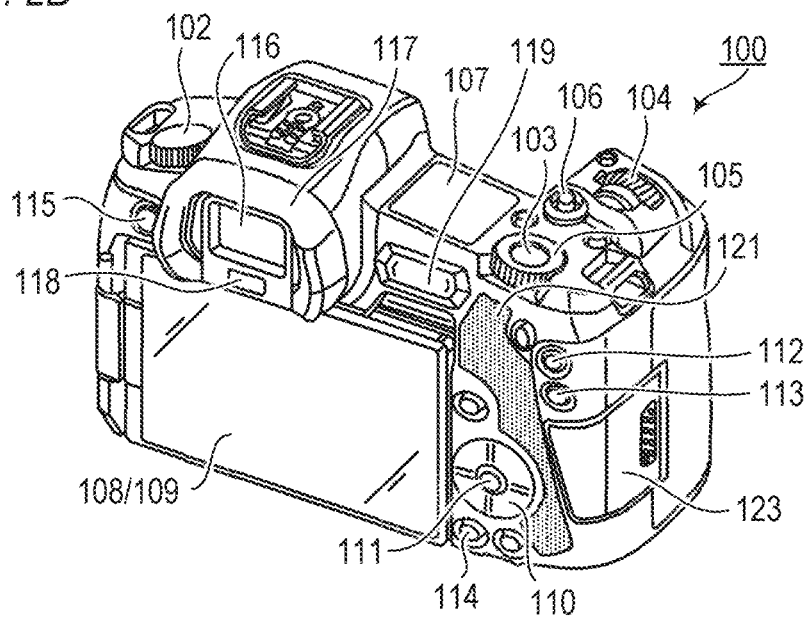

FIGS. 2A and 2B are views showing an example of the appearance of a digital camera (camera) 100. The camera 100 shows an example of the electronic device according to this embodiment. FIG. 2A is a perspective view of the camera 100 when viewed from the front surface. FIG. 2B is a perspective view of the camera 100 when viewed from the back surface.

The camera 100 has a shutter button 101, a power switch 102, a mode selection switch 103, a main electronic dial 104, a sub-electronic dial 105, a moving-image button 106, and an extra-finder display unit 107, all of which are provided on the upper surface. The shutter button 101 is an operation member used to provide photographing preparation instructions or photographing instructions. The power switch 102 is an operation member used to switch between the on and off states of the power of the camera 100. The mode selection switch 103 is an operation member used to select various modes. The main electronic dial 104 is a rotary operation member used to change setting values such as a shutter speed and an aperture. The sub-electronic dial 105 is a rotary operation member used to perform movement of a selected frame (cursor), image feeding, and the like. The moving-image button 106 is an operation member used to provide instructions to start or stop photographing (recording) moving images. The extra-finder display unit 107 displays various setting values including a shutter speed or an aperture.

The camera 100 has a display unit 108, a touch panel 109, a direction key 110, a SET button 111, an AE lock button 112, an enlargement button 113, a reproduction button 114, a menu button 115, an eyepiece unit 116, an eyepiece detection unit 118, and a touch bar 119, all of which are provided on the rear surface.

The display unit 108 displays images and various information. The touch panel 109 is an operation member used to detect touch operations on the display surface (touch operation surface) of the display unit 108. The direction key 110 is an operation member composed of keys (four-direction key) that may be pressed in both vertical and horizontal directions. It is possible to perform processing on the basis of the pressed position of the direction key 110. The SET button 111 is an operation member pressed mainly to determine a selected item. The AE lock button 112 is an operation member pressed to hold an exposed state in a photographing standby state. The enlargement button 113 is an operation member used to switch between the on and off states of an enlargement mode in the live-view display (LV display) of a photographing mode. When the enlargement mode is turned on, a live-view image (LV image) is enlarged or contracted along with the operation of the main electronic dial 104. Further, the enlargement button 113 is used to enlarge a reproduction image or increase a magnification ratio in a reproduction mode. The reproduction button 114 is an operation member used to switch between the photographing mode and the reproduction mode. When the reproduction button 114 is pressed during the photographing mode, the camera 100 transitions to the reproduction mode, and the display unit 108 displays the latest image among images recorded on a recording medium 227.

The menu button 115 is an operation member pressed to display a menu screen on the display unit 108 where various settings are possible. The user is enabled to intuitively perform various settings on the menu screen displayed on the display unit 108, using the direction key 110 and the SET button 111. The eyepiece unit 116 is a looking-into portion where the user looks into an eyepiece finder (looking-into type finder) 117. Through the eyepiece unit 116, the user is enabled to visually recognize video displayed on an electronic viewfinder (EVF) 217 inside the camera 100. The eyepiece detection unit 118 is a sensor used to detect whether an eye of the user is in contact with the eyepiece unit 116 (or the eyepiece finder 117).

The touch bar 119 is a linear touch-operation member (line touch sensor) capable of receiving touch operations. The touch bar 119 is arranged at the touchable position where the user is enabled to perform touch operations with the thumb of the right hand while holding a grip unit 120 with the right hand (i.e., holding the grip unit 120 with the little finger, the ring finger, and the middle finger of the right hand) so as to enable pressing of the shutter button 101 with the index finger of the right hand. In other words, the touch bar 119 is operable while the user looks into the eyepiece unit 116 through the eyepiece finder 117 and holds the camera 100 up (i.e., a photographing posture) to be capable of pressing the shutter button 101 at all times. The touch bar 119 is capable of receiving operations such as tapping (releasing the thumb from a touched position without moving for a prescribed period after touching) on the touch bar 119 and sliding (moving the touched position while maintaining contact after touching) in the left-and-right direction on the touch bar 119. The touch bar 119 is an operation member different from the touch panel 109 and does not include a display function. The touch bar 119 functions as, for example, a multi-function bar (M-Fn bar) to which various functions may be assigned.

Further, the camera 100 also has a grip unit 120, a thumb-rest unit 121, a terminal cover 122, a lid 123, a communication terminal 124, and the like. The grip unit 120 is a holding unit formed into a shape easily gripped by the right hand when the user holds the camera 100 up. The shutter button 101 and the main electronic dial 104 are arranged at the positions where the user is enabled to perform operations with the index finger of the right hand while holding the camera 100 with the grip unit 120 gripped by the little finger, the ring finger, and the middle finger of the right hand. Further, in the same state, the sub-electronic dial 105 and the touch bar 119 are arranged at the positions where the user is enabled to perform operations with the thumb of the right hand. The thumb-rest unit 121 (thumb standby position) is a grip unit provided on the rear-surface side of the camera 100, where the user is enabled to easily place the thumb of the right hand gripping the grip unit 120 when not operating any operation member. The thumb-rest unit 121 is composed of a rubber member or the like used to increase a holding force (grip feeling). The terminal cover 122 protects a connector such as a connection cable that connects the camera 100 to an external device (external equipment). The lid 123 closes a slot where the recording medium 227 described later is stored to protect the recording medium 227 and the slot. The communication terminal 124 is a terminal used to perform communication with a lens unit (such as a lens unit 200 and a lens unit 300) that is attachable to and detachable from the camera 100.

Figure 3:
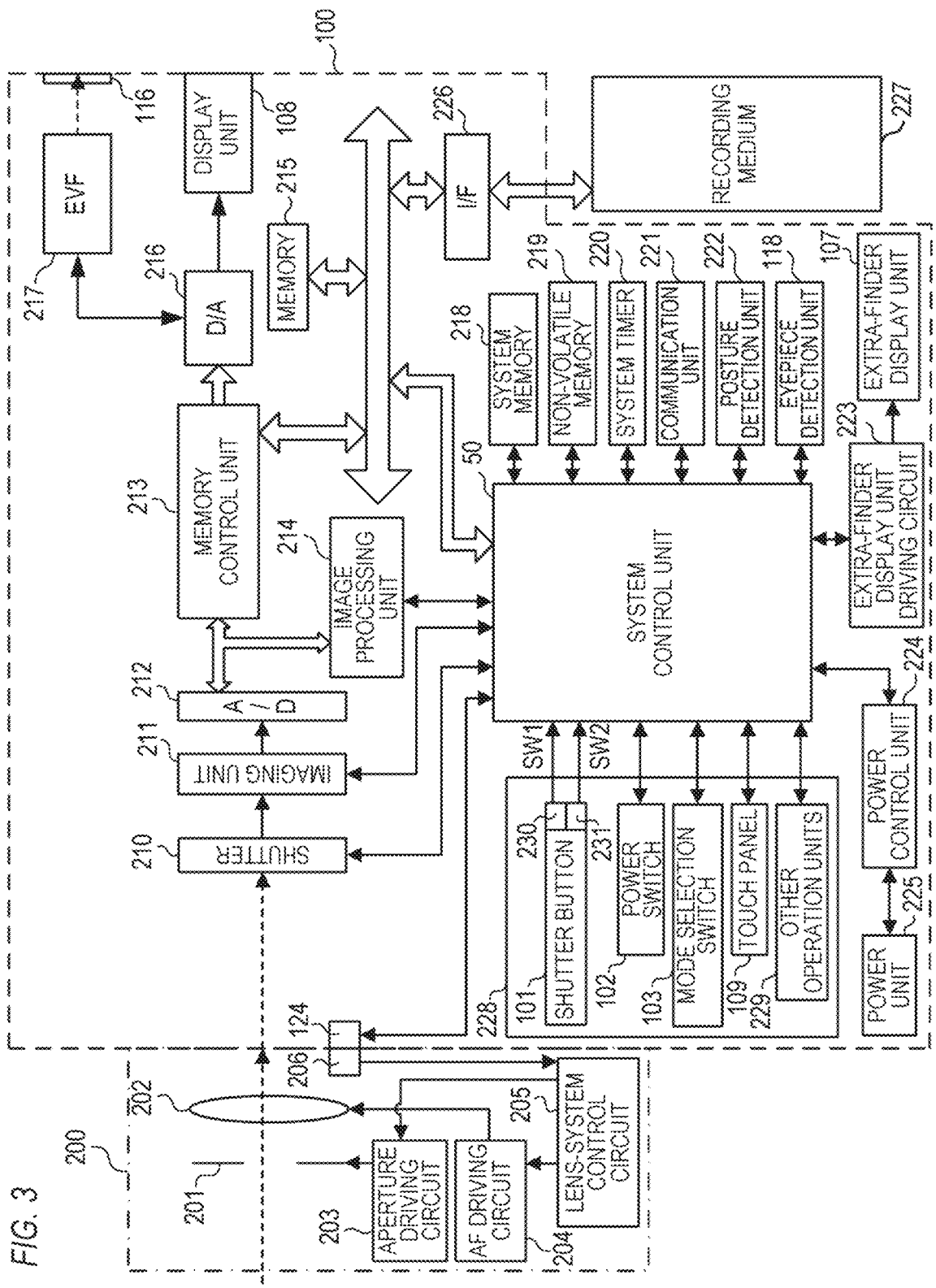
FIG. 3 is a block diagram of the camera.

FIG. 3 is a block diagram showing an example of the configuration of the camera 100. Note that in FIG. 3, the same components as those of FIGS. 2A and 2B are denoted by the same reference numerals, and their descriptions will be omitted where necessary. In FIG. 3, a lens unit 200 is attached to the camera 100.

First, the lens unit 200 will be described. The lens unit 200 is a type of a replaceable lens unit (replacement lens) attachable to and detachable from the camera 100. The lens unit 200 is a single-lens unit (monocular lens) and shows an example of a normal lens unit. The lens unit 200 has an aperture 201, a lens 202, an aperture driving circuit 203, an auto focus (AF) driving circuit 204, a lens-system control circuit 205, a communication terminal 206, and the like.

The aperture 201 is configured to be capable of adjusting an aperture diameter. The lens 202 is composed of a plurality of lenses. The aperture driving circuit 203 adjusts a light amount by controlling the aperture diameter of the aperture 201. The AF driving circuit 204 drives the lens 202 to obtain focus. The lens-system control circuit 205 controls the aperture driving circuit 203, the AF driving circuit 204, and the like on the basis of instructions from a system control unit 50. The lens-system control circuit 205 controls the aperture 201 via the aperture driving circuit 203 and obtains focus by changing the position of the lens 202 via the AF driving circuit 204. The lens-system control circuit 205 is capable of performing communication with the camera 100. Specifically, the camera 100 and the lens unit 200 perform communication via the communication terminal 206 of the lens unit 200 and the communication terminal 124 of the camera 100. The communication terminal 206 is a terminal used when the lens unit 200 performs communication with the camera 100.

Next, the camera 100 will be described. The camera 100 has a shutter 210, an imaging unit 211, an A/D convertor 212, a memory control unit 213, an image processing unit 214, a memory 215, a D/A convertor 216, an EVF 217, a display unit 108, and a system control unit 50.

The shutter 210 is a focal-plane shutter capable of freely controlling the exposure time of the imaging unit 211 on the basis of instructions from the system control unit 50. The imaging unit 211 is an imaging element (image sensor) composed of a CCD element, a CMOS element, or the like that converts optical images into electric signals. The imaging unit 211 may have an imaging-plane phase difference sensor that outputs defocus-amount information to the system control unit 50. The A/D convertor 212 converts analog signals output from the imaging unit 211 into digital signals. The image processing unit 214 performs prescribed processing (resize processing such as pixel interpolation and contraction, color conversion processing, and the like) on data from the A/D convertor 212 or data from the memory control unit 213. Further, the image processing unit 214 performs prescribed computational processing using data from captured images. The system control unit 50 performs exposure control or ranging control on the basis of the obtained computation results. By this processing, AF processing of a through-the-lens (TTL) system, automatic exposure (AE) processing, electronic flash pre-emission (EF) processing, and the like are performed. Moreover, the image processing unit 214 performs prescribed computational processing using data from captured images. The system control unit 50 performs automatic white balance (AWB) processing of a TTL system on the basis of the obtained computation results.

The image data from the A/D convertor 212 is written into the memory 215 via the image processing unit 214 and the memory control unit 213. Alternatively, the image data from the A/D convertor 212 is written into the memory 215 via the memory control unit 213 without being subjected to the image processing unit 214. The memory 215 stores the image data obtained by the imaging unit 211 and converted into digital data by the A/D convertor 212 or the image data that is to be displayed on the display unit 108 or the EVF 217. The memory 215 includes storage capacity enough to store a prescribed number of still images or moving images and sounds for a prescribed period of time. Further, the memory 215 serves also as a memory (video memory) for displaying images.

The D/A convertor 216 converts the image data for display stored in the memory 215 into analog signals and supplies the converted signals to the display unit 108 and the EVF 217. Accordingly, the image data for display written into the memory 215 is displayed on the display unit 108 or the EVF 217 via the D/A convertor 216. The display unit 108 and the EVF 217 perform displays according to the analog signals from the D/A convertor 216. The display unit 108 and the EVF 217 are, for example, displays such as an LCD and an organic EL display. The digital data A/D-converted by the A/D convertor 212 is accumulated in the memory 215 as digital signals. The digital signals are converted into analog signals by the D/A convertor 216. After the conversion, the analog signals are sequentially transferred to the display unit 108 and the EVF 217. The display unit 108 and the EVF 217 perform live-view displays by displaying the transferred analog signals.

The system control unit 50 is a control unit including at least one processor and/or at least one circuit. In other words, the system control unit 50 may be a processor, a circuit, or a combination thereof. The system control unit 50 controls the whole camera 100. The system control unit 50 realizes each processing of the flowcharts described later by executing a program recorded on a non-volatile memory 219. Further, the system control unit 50 also performs display control by controlling the memory 215, the D/A convertor 216, the display unit 108, the EVF 217, and the like.

Further, the camera 100 has a system memory 218, the non-volatile memory 219, a system timer 220, a communication unit 221, a posture detection unit 222, and an eyepiece detection unit 118.

As the system memory 218, a random access memory (RAM) is, for example, used. Into the system memory 218, a constant for operating the system control unit 50, a variable, a program read from the non-volatile memory 219, and the like are developed. The non-volatile memory 219 is an electrically erasable/recordable memory. An electrically erasable programmable read-only memory (EEPROM) (registered trademark) is, for example, used as the non-volatile memory 219. On the non-volatile memory 219, a constant for operating the system control unit 50, a program, and the like are recorded. Here, the program refers to a program for executing the flowcharts described later. The system timer 220 is a clocking unit that measures the time used in various control processes or the time of the embedded clock.

The communication unit 221 performs the transmission and reception of video signals or sound signals with the external device connected via a wireless or wired cable. The communication unit 221 is also capable of connecting to a wireless local area network (LAN) or the Internet. Further, the communication unit 221 is capable of communicating with the external device through Bluetooth (registered trademark) or Bluetooth Low Energy. The communication unit 221 is capable of transmitting images (including live-view images) captured by the imaging unit 211 or images recorded on the recording medium 227. The communication unit 221 is capable of receiving images or various other information from the external device.

The posture detection unit 222 is a posture detection sensor that detects the posture of the camera 100 with respect to the gravity direction. On the basis of the posture detected by the posture detection unit 222, it is possible to discriminate whether images captured by the imaging unit 211 was captured with the camera 100 held in horizontal orientation or vertical orientation. The system control unit 50 is capable of adding orientation information corresponding to the posture detected by the posture detection unit 222 to the image files of the images captured by the imaging unit 211. Further, the system control unit 50 is also capable of rotating and recording the images on the basis of the posture detected by the posture detection unit 222. As the posture detection unit 222, an acceleration sensor, a gyro sensor, or the like is, for example, usable. It is also possible to detect the movement (pan, tilt, lifting, standing-still, or the like) of the camera 100 using the posture detection unit 222.

The eyepiece detection unit 118 is capable of detecting the approach of an object toward the eyepiece unit 116 (the eyepiece finder 117). As the eyepiece detection unit 118, an infrared proximity sensor is, for example, usable. When an object approaches, infrared light projected from the projection unit of the eyepiece detection unit 118 is reflected at the object and received by the light-receiving unit of the infrared proximity sensor. On the basis of the amount of the received infrared light, the eyepiece detection unit 118 is enabled to discriminate the distance from the eyepiece unit 116 to the object. As described above, the eyepiece detection unit 118 performs eyepiece detection to detect the proximity distance of an object to the eyepiece unit 116. The eyepiece detection unit 118 is an eyepiece detection sensor that detects the approach (contact) and regression (separation) of an eye (object) relative to the eyepiece unit 116. When an eye approaching the eyepiece unit 116 within a prescribed distance is detected from a non-contacting state (non-approaching state), the eyepiece detection unit 118 detects the contact of the eye. On the other hand, when the eye having approached the eyepiece unit 116 is separated by at least a prescribed distance from a contacting state (approaching state), the eyepiece detection unit 118 detects the separation of the eye. A threshold for detecting the contact and a threshold for detecting the separation may differ from each other by, for example, setting hysteresis or the like.

Further, after the detection of the contact, it is assumed that the contacting state is maintained until the separation is detected. After the detection of the separation, it is assumed that the non-contacting state is maintained until the contact is detected. The system control unit 50 switches between the display (display state) and non-display (non-display state) of the display unit 108 and the EVF 217 on the basis of the state detected by the eyepiece detection unit 118. Specifically, when the camera 100 is in at least a photographing standby state and its display destination setting is set to automatic switching, the system control unit 50 brings the display unit 108 into a display state as the display destination and the EVF 217 into a hidden state when not in contact with the eye. Further, the system control unit 50 brings the EVF 217 into a display state as the display destination and the display unit 108 into a hidden state when in contact with the eye. Note that the eyepiece detection unit 118 is not limited to an infrared proximity sensor. Any sensor that is capable of detecting a state considered as the contact may be used as the eyepiece detection unit 118.

Further, the camera 100 has the extra-finder display unit 107, an extra-finder display unit driving circuit 223 for the display unit located outside the viewfinder, a power control unit 224, a power unit 225, a recording medium I/F 226, an operation unit 228, and the like.

The extra-finder display unit 107 is driven by the extra-finder display unit driving circuit 223 for the display unit located outside the viewfinder and displays various setting values of the camera 100 such as a shutter speed and an aperture.

The power control unit 224 is composed of a battery detection circuit, a DC-DC convertor, a switch circuit that switches blocks to be energized, and the like. The power control unit 224 detects the presence or absence of a battery, the type of the battery, the remaining battery level, and the like. Further, the power control unit 224 controls the DC-DC convertor on the basis of the detection results and instructions from the system control unit 50 and supplies a voltage to each unit including the recording medium 227 for a required period.

The power unit 225 includes a primary battery such as an alkali battery and a lithium battery, a secondary battery such as an NiCd battery, an NiMH battery, and an Li battery, an AC adapter, and the like.

The recording medium I/F 226 is an interface with the recording medium 227 such as a memory card and a hard disk. The recording medium 227 is, for example, a memory card or the like for recording captured images. The recording medium 227 includes a semiconductor memory, a magnetic disk, and the like. The recording medium 227 may be attachable to and detachable from the camera 100. The recording medium 227 may be embedded in the camera 100.

The operation unit 228 is an input unit (reception unit) that is capable of receiving operations (user operations) from the user. The operation unit 228 is used to input various instructions to the system control unit 50. The operation unit 228 includes the shutter button 101, the power switch 102, the mode selection switch 103, the touch panel 109, other operation units 229, and the like. The operation units 229 include the main electronic dial 104, the sub-electronic dial 105, the moving-image button 106, the direction key 110, the SET button 111, the AE lock button 112, the enlargement button 113, the reproduction button 114, the menu button 115, the touch bar 119, and the like.

The shutter button 101 has a first shutter switch 230 and a second shutter switch 231. The first shutter switch 230 is turned on halfway through the operation of the shutter button 101, i.e., half-pressing (photographing preparation instructions), and outputs a first shutter switch signal SW1. The system control unit 50 starts photographing preparation processing such as AF processing, AE processing, AWB processing, and EF processing on the basis of the first shutter switch signal SW1. The second shutter switch 231 is turned on when the operation of the shutter button 101 is completed, i.e., full-pressing (photographing instructions), and outputs a second shutter switch signal SW2. The system control unit 50 starts a series of photographing processing from reading of a signal from the imaging unit 211 to writing of an image file including a captured image into the recording medium 227 after generating the image file on the basis of the second shutter switch signal SW2.

The mode selection switch 103 switches the operation mode of the system control unit 50 to any of a still-image photographing mode, a moving-image photographing mode, a reproduction mode, or the like. The still-image photographing mode includes an automatic photographing mode, an automatic scene determination mode, a manual mode, an aperture priority mode (Av mode), a shutter-speed priority mode (Tv mode), and a program AE mode (P mode). Further, the still-image photographing mode also includes various scene modes for setting photography parameters for each photographing scene, a custom mode, and the like. Through the mode selection switch 103, the user is enabled to directly switch the operation mode to any of the photographing modes described above. Alternatively, after temporarily switching to the list screen of the photographing modes through the mode selection switch 103, the user is enabled to select any of the plurality of the displayed modes using the operation unit 228. Similarly, the moving-image photographing mode may include a plurality of modes.

The touch panel 109 is a touch sensor that detects various touch operations on the display surface of the display unit 108 (the operation surface of the touch panel 109). The touch panel 109 and the display unit 108 may be integrally configured. For example, the touch panel 109 is attached to the upper layer of the display surface of the display unit 108 so that the light transmission does not interfere with the display of the display unit 108. Further, by associating input coordinates in the touch panel 109 with display coordinates on the display surface of the display unit 108, it is possible to configure a graphical user interface (GUI) that makes the user feel as if he/she were able to directly operate a screen displayed on the display unit 108. The touch panel 109 may be any of various types, such as a resistance-film type, a capacitance type, a surface acoustic type, an infrared type, an electromagnetic induction type, an image recognition type, and an optical sensor type. There are types that detect touch operations when the touch panel 109 is touched and types that detect touch operations when a finger or a pen approaches the touch panel 109. However, any of these types may be used.

The system control unit 50 is capable of detecting the following operations or states on the touch panel 109.

A state where a finger or a pen that has not touched the touch panel 109 newly touches the touch panel 109, i.e., the start of a touch (hereinafter referred to as touch-down).

A state where the touch panel 109 is touched by a finger or a pen (hereinafter referred to as touch-on).

A state where a finger or a pen moves while touching the touch panel 109 (hereinafter referred to as touch-move).

A state where a finger or a pen that has touched the touch panel 109 is separated (released) from the touch panel 109, i.e., the end of a touch (hereinafter referred to as touch-up).

A state where the touch panel 109 is not touched (hereinafter referred to as touch-off).

The touch-on is detected simultaneously when the touch-down is detected. Generally, the touch-on is continuously detected unless the touch-up is detected after the touch-down. The touch-on is continuously detected when the touch-move is detected. Even if the touch-on has been detected, the touch-move is not detected unless a touch position has been moved. After the touch-up of all touched fingers or a pen is detected, the touch-off is detected.

Via an internal bus, the system control unit 50 is notified of these operations and states or position coordinates at which a finger or a pen has touched the touch panel 109. On the basis of the notified information, the system control unit 50 determines what operation (touch operation) has been performed on the touch panel 109. For the touch-move, the system control unit 50 is also capable of determining the movement direction of a finger or a pen that moves on the touch panel 109 for each of a vertical component and a horizontal component on the touch panel 109 on the basis of the changes of position coordinates. The system control unit 50 determines that a slide operation has been performed when detecting the touch-move by at least a prescribe distance. The operation of quickly moving a finger by a certain distance while touching the touch panel 109 and then releasing the same will be referred to as a flick. In other words, the flick is the operation of quickly tracing the touch panel 109 so as to be flipped with the finger. The system control unit 50 is capable of determining that the flick has been performed when detecting that the touch-move has been performed by at least a prescribed distance and at least at a prescribed speed and then the touch-up has been performed in succession to the touch-move (the flick has been performed in succession to the slide operation). Moreover, the touch operation of simultaneously touching a plurality of spots (for example, two points) (multi-touch) and making the touched positions get close to each other will be referred to as pinch-in, and the touch operation of making the touched positions get away from each other will be referred to as pinch-out. The pinch-out and the pinch-in will be generically referred to as a pinch operation (or simply a pinch).

Figure 4:
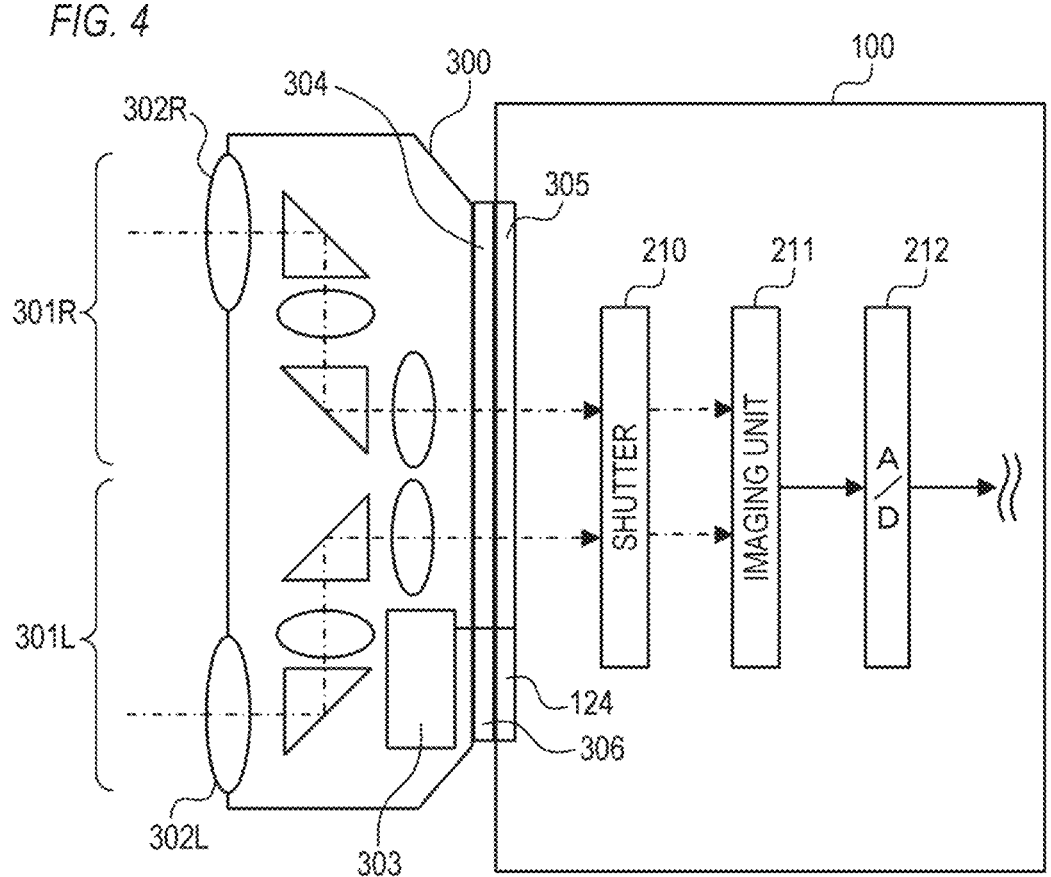
FIG. 4 is a schematic diagram showing the configuration of a lens unit.

FIG. 4 is a schematic diagram showing an example of the configuration of the lens unit 300. FIG. 4 shows a state where the lens unit 300 is attached to the camera 100. Note that in the camera 100 shown in FIG. 4, the same components as those described in FIG. 3 are denoted by the same reference numerals, and their descriptions will be omitted where necessary. For components related to the right eye, the letter R is added to the end of each reference numeral. For components related to the left eye, the letter L is added to the end of each reference numeral. For components related to both the right and left eyes, neither R nor L is added to the end of each reference numeral.

The lens unit 300 is a type of a replaceable lens unit attachable to and detachable from the camera 100. The lens unit 300 is a binocular lens unit that enables the capturing of a right image and a left image with parallax relative to each other. The lens unit 300 has two optical systems and is capable of capturing images with a wide view angle of approximately 180 degrees using each of the two optical systems. Specifically, the lens unit 300 is capable of capturing images of objects using each of the two optical systems with a visual field (view angle) of 180 degrees in the left-and-right direction (horizontal angle, azimuthal angle, and yaw angle) and 180 degrees in the top-and-bottom direction (vertical angle, elevation angle, and pitch angle). In other words, the lens unit 300 is capable of capturing images within a forward hemispherical range using each of the two optical systems.

The lens unit 300 has an optical system 301R with a plurality of lenses, a reflection mirror, and the like, an optical system 301L with a plurality of lenses, a reflection mirror, and the like, and a lens-system control circuit 303. The optical system 301R has a lens 302R arranged on an object side, and the optical system 301L has a lens 302L arranged on the object side. The lenses 302R and 302L are oriented in the same direction, and their optical axes are substantially parallel to each other.

The lens unit 300 is a binocular lens unit (VR180 lens unit) used to capture images in VR180 format, which is one of the virtual reality (VR) image formats that enable binocular three-dimensional viewing. The lens unit 300 has a fish-eye lens in each of the optical systems 301R and 301L, each capable of capturing a field of view of approximately 180 degrees. Note that the field of view capable of being captured by the lens in each of the optical systems 301R and 301L may be narrower than 180 degrees, such as approximately 120 degrees or 160 degrees.

The lens unit 300 is capable of forming a right image formed via the optical system 301R and a left image formed via the optical system 301L on one or two imaging elements of the camera to which the lens unit 300 is attached. In the camera 100, a right image and a left image are formed on one imaging element (imaging sensor), creating one image (binocular image) where a right-image region (the region of the right image) and a left-image region (the region of the left image) are arranged side by side.

The lens unit 300 is attached to the camera 100 via a lens mount unit 304 and a camera mount unit 305 of the camera 100. The system control unit 50 of the camera 100 and the lens-system control circuit 303 of the lens unit 300 are electrically connected to each other via the communication terminal 124 of the camera 100 and the communication terminal 306 of the lens unit 300.

In the configuration of FIG. 4, a right image formed via the optical system 301R and a left image formed via the optical system 301L are formed side by side on the imaging unit 211 of the camera 100. In other words, two optical images (object images) are formed on two regions of one imaging element (imaging sensor) by the optical systems 301R and 301L. The imaging unit 211 converts the formed optical images (light signals) into analog electric signals. By using the lens unit 300 as described above, it is possible to capture one image containing two image regions with parallax relative to each other from the two spots of the optical systems 301R and 301L. When the captured image is divided into a left-eye image and a right-eye image for a VR display, the user is enabled to view a three-dimensional VR image with a field of view of approximately 180 degrees. In other words, the user is enabled to view the image in VR180 format in three dimensions.

The lens unit 300 includes a focus ring (not shown) that is used to adjust focus. The lens unit 300 includes, for example, two focus rings, i.e., a focus ring that is used to adjust the focus of a right image formed via the optical system 301R and a focus ring that is used to adjust the focus of a left image formed via the optical system 301L. The lens unit 300 may also include a focus ring that simultaneously adjusts the focus of both a right image formed via the optical system 301R and the focus of a left image formed via the optical system 301L, as well as a focus ring that adjusts the focus of one of a right image and a left image.

Here, the VR image refers to an image capable of being displayed in VR as described later. The VR image includes omnidirectional images (celestial sphere images) captured by an omnidirectional camera (celestial sphere camera), panoramic images with a video range (effective video range) wider than the display range capable of being displayed on the display unit at once, and the like. Further, the VR image is not limited to still images but also includes moving images and live images (images captured from the camera in almost real time). The VR image has a video range (effective video range) with a visual field of 360 degrees in the left-and-right direction and a visual field of 360 degrees in the top-and-bottom direction at maximum. Further, the VR image also includes images captured at view angles wider than those of typical cameras, even if the view angles cover less than 360 degrees horizontally and vertically. Alternatively, the VR image also includes images with video ranges that exceed the display ranges displayable on the display unit at once. Images captured by the camera 100 using the lens unit 300 described above are a type of the VR image. The VR image is capable of being displayed in VR, for example, by setting the display mode of the display device (display device capable of displaying the VR image) to "VR view." By displaying a part of the VR image with a view angle of 360 degrees and changing the posture of the display device in the left-and-right direction (horizontal rotation direction), it is possible for the user to move a display range and view an omnidirectional video seamless in the left-and-right direction.

The VR display (VR view) refers to a display method (display mode) that displays, as a VR image, video within a visual field corresponding to the posture of the display device and enables a display range to be changed. The VR display includes a "monocular VR display (monocular VR view)" where a VR image is transformed (distortion correction) to be mapped onto a virtual sphere to display one image. Further, the VR display includes a "binocular VR display (binocular VR view)" where a VR image for the left eye and a VR image for the right eye are transformed to be mapped onto a virtual sphere and displayed side by side in left and right regions. By performing the "binocular VR display" using the VR image for the left eye and the VR image for the right eye with parallax relative to each other, it is possible to view the VR images in three dimensions. For example, when the user wears a display device such as a head-mounted display (HMD), video within the visual field corresponding to the orientation of the user's face is displayed in both the monocular VR display and the binocular VR display. For example, it is assumed that the video within a visual field centered at 0 degrees in the left-and-right direction (in a specific direction, for example, the north) and 90 degrees in the top-and-bottom direction (90 degrees from the zenith, that is, the horizontal level) at a certain time point is displayed as a VR image. When the posture of the display device is turned inside out (for example, when the orientation of the display surface is changed from the south to the north) from this state, the display range is adjusted so that the video within the visual field centered at 180 degrees (in the opposite direction, for example, the south) in the left-and-right direction and 90 degrees in the top-and-bottom direction is displayed as the same VR image. In other words, when the user turns the face from the north to the south (that is, when the user looks back) while wearing the HMD, the video displayed on the HMD also changes from video in the north to video in the south. Note that the VR image captured using the lens unit 300 is an image (180° image) obtained by capturing the range of approximately 180 degrees in a forward direction and does not include video within the range of approximately 180 degrees in a backward direction. When such an image is displayed in VR and the posture of the display device is changed to a side where video does not exist, a blank region is displayed.

When the VR image is displayed in VR as described above, the user is enabled to obtain a feeling (a sense of immersion) as if he/she were visually present in the VR image (VR space). Note that the method for displaying the VR image is not limited to changing the posture of the display device. For example, the display range may be moved (scrolled) according to user operations via a touch panel, a direction button, or the like. Further, during the VR display (display mode "VR view"), the display range may be moved according to touch-move on the touch panel, drag operations with a mouse or the like, pressing of the direction button, or the like, in addition to changing the display range on the basis of changes in posture. Note that a smartphone attached to VR goggles (a head-mounted adapter) is a type of HMD.

Figure 5:
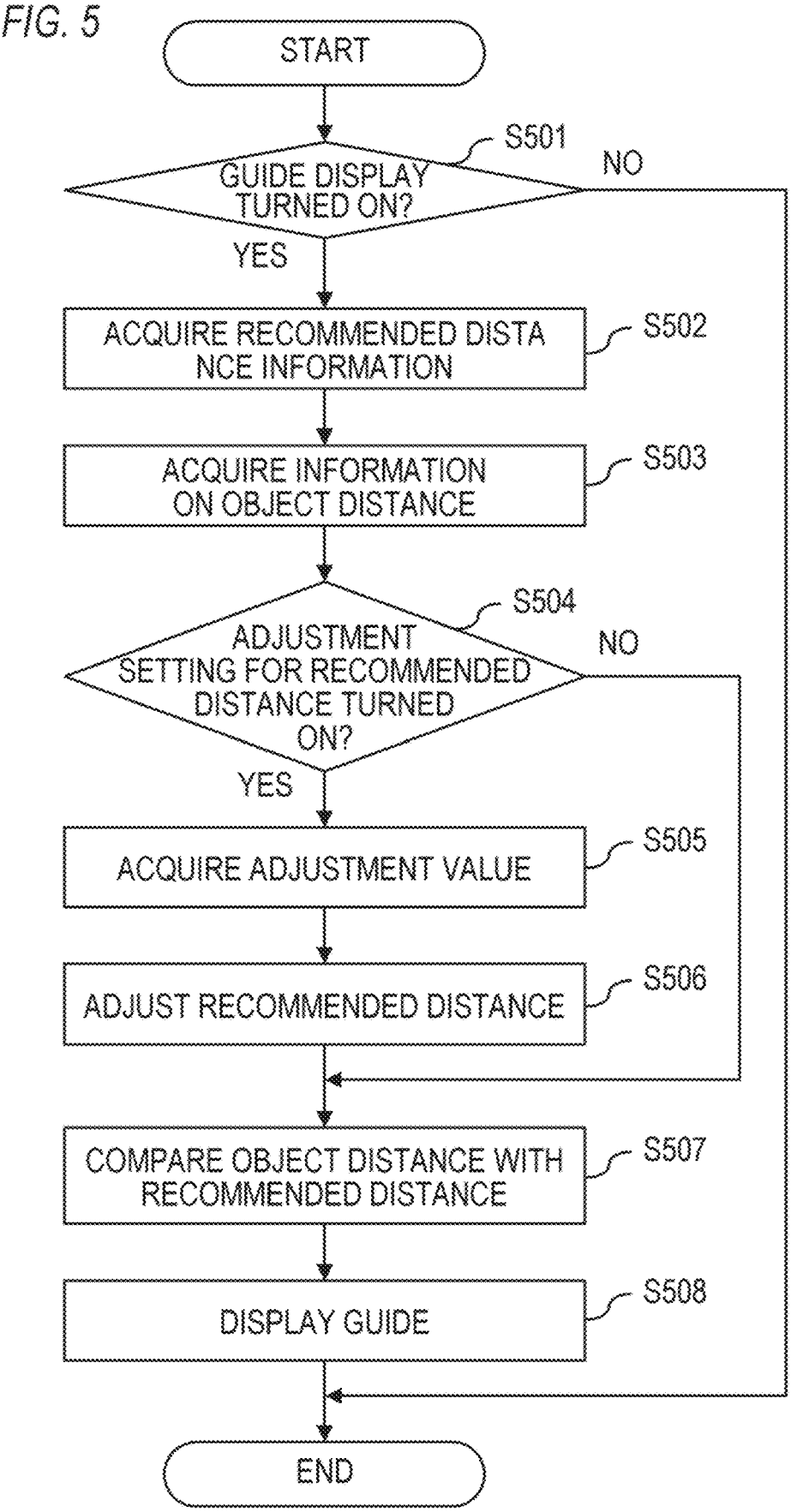
FIG. 5 is a flowchart illustrating guide display processing according to a first embodiment.

With reference to FIG. 5, guide display processing according to the first embodiment will be described. The camera 100 displays a guide to notify the user whether a distance to an object matches a photographing distance that enables three-dimensional viewing on a display device such as an HMD. The guide shows the relationship between a recommended distance and a distance (hereinafter referred to as an object distance) from the camera 100 to the object. The guide may be represented by graphics or text information, or it may be expressed through display modes such as image tinge. The recommended distance represents a photographing distance that enables three-dimensional viewing of a captured image containing two image regions with parallax relative to each other. By displaying the guide showing the relationship between the recommended distance and the object distance, the camera 100 assists the user in photographing the object to enable three-dimensional viewing.

In step S501, the system control unit 50 determines whether a display setting for a guide, which notifies the user whether a captured image is viewable in three-dimensions on a display device such as an HMD, is turned on. From a menu screen, the user may display a screen for the display setting for the guide and turn a guide display on or off. When the display setting for the guide is turned on, the system control unit 50 displays the guide that shows whether the captured image is viewable in three dimensions when the user performs photographing.

Figure 6:
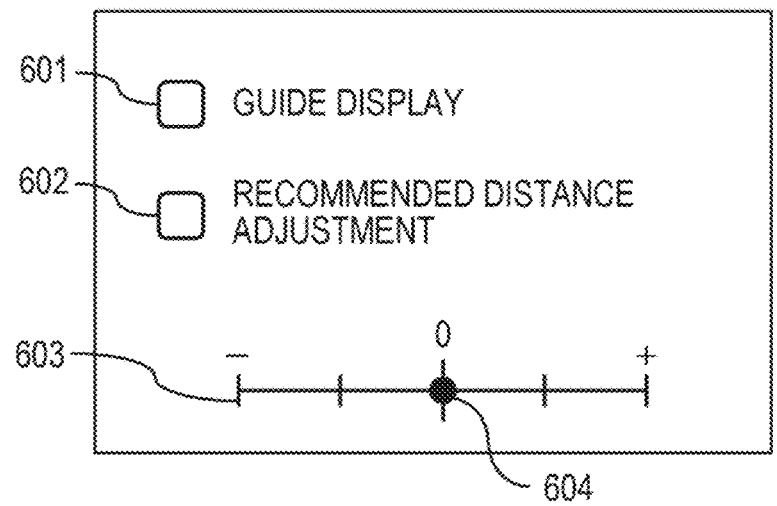
FIG. 6 is a diagram showing an example of a setting screen.

FIG. 6 shows an example of a setting screen for a display setting for a guide. By checking a check box 601 for a "guide display," the user is enabled to turn a display setting for a guide on. Conversely, by unchecking the check box 601, the user is enabled to turn the display setting for the guide off. In step S501, the system control unit 50 is enabled to determine whether the display setting for the guide is turned on, on the basis of a value set on the setting screen illustrated in FIG. 6. When the display setting for the guide is turned on, the processing proceeds to step S502. When the display setting for the guide is turned off, the processing shown in FIG. 5 ends.

In step S502, the system control unit 50 acquires information on a recommended distance for the lens unit 300 (hereinafter referred to as recommended distance information). The recommended distance represents a photographing distance that enables three-dimensional viewing of a captured image containing two image regions with parallax relative to each other. In other words, by adjusting a distance to an object to match the recommended distance, the user is enabled to perform imaging so that three-dimensional viewing of a captured image containing the object is possible.

The recommended distance varies depending on a baseline length, which represents the distance between the left and right lenses (optical systems) of the lens unit 300 that capture the two image regions, respectively. The distance to the object to capture an image so that the object is viewable in three dimensions is proportional to the baseline length. Accordingly, the recommended distance information may be acquired on the basis of the baseline length. Further, the proportional relationship may be calculated on the basis of a model of the inter-pupil distance, which represents the distance between the left and right eyes of an assumed person, and a model of the distance to the object (observed object) at which three-dimensional viewing is possible with the naked eye. The model of the inter-pupil distance is the reference value of the inter-pupil distance and will be referred to as the reference inter-pupil distance below. The model of the distance to the object at which three-dimensional viewing is possible with the naked eye is the reference value of the distance to the object at which three-dimensional viewing is possible and will be referred to as the reference three-dimensional viewing distance below.

Specifically, the recommended distance may be calculated from the following Formulae 1 and 2. A proportionality constant K represents the proportional relationship between the inter-pupil distance and the three-dimensional viewing distance.

$K$=Reference three-dimensional viewing distance/Reference inter-pupil distance     Formula 1

Recommended distance=Baseline length×$K$     Formula 2

For example, the reference inter-pupil distance is assumed to be 6 cm, which is a typical inter-pupil distance. The reference three-dimensional viewing distance is assumed to be 5 m (500 cm), which is the maximum distance at which three-dimensional viewing with the naked eye is assumed to be possible. Further, the baseline length of the lens unit 300 is, for example, assumed to be 3 cm. In this case, the proportionality constant K=500/6. The maximum recommended distance at which three-dimensional viewing is possible is 3 cm×(500/6)=2,500 cm (2.5 m).

The recommended distance information may be acquired in advance on the basis of the baseline length of the lens unit 300 if the proportionality constant K is set. The camera 100 is capable of retaining the acquired recommended distance information in advance.

Further, the acquired recommended distance information may be retained in a recording region inside the lens unit 300. The lens-system control circuit 303 transmits the recommended distance information retained in the recording region to the camera 100 via the communication terminal 306 and the communication terminal 124 of the camera 100. As described above, the system control unit 50 may acquire the recommended distance information from the lens unit 300, which is attached to the camera 100 and has the two optical systems that capture the two image regions, respectively.

Note that the recommended distance information is the maximum photographing distance at which three-dimensional viewing of a captured image is possible as described above, but it may also include the minimum photographing distance at which three-dimensional viewing of a captured image is possible. In other words, the recommended distance information may also include the range of photographing distances at which three-dimensional viewing is possible when a captured image with two image regions is displayed on the display device.

Further, the lens unit 300 may transmit information on the baseline length to the camera 100 instead of the information on the recommended distance. Using the information on the baseline length acquired from the lens unit 300, the camera 100 is enabled to calculate and acquire the recommended distance according to the above Formulae 1 and 2.

In step S503, the system control unit 50 acquires information on the distance (object distance) from the camera 100 to the object. The system control unit 50 is enabled to acquire the object distance on the basis of the focal length of the camera 100. For example, the lens-system control circuit 303 of the lens unit 300 is enabled to acquire the object distance on the basis of the position of a focus ring that adjusts focus. The lens-system control circuit 303 transmits the acquired object distance via the communication terminal 306 and the communication terminal 124 of the camera 100. As a result, the system control unit 50 is enabled to acquire the object distance from the lens unit 300.

Note that the method for acquiring the object distance is not limited to acquiring the object distance on the basis of the position of the focus ring. For example, the system control unit 50 of the camera 100 is enabled to acquire the information on the object distance on the basis of the parallax between two image regions captured using the lens unit 300. Further, the system control unit 50 is also enabled to acquire the information on the object distance on the basis of phase difference information output from an image-plane phase difference sensor provided in the camera 100. Further, the system control unit 50 is also enabled to acquire the information on the object distance on the basis of output from a time of flight (TOF) sensor provided in the camera 100.

In step S504, the system control unit 50 determines whether an adjustment setting for the recommended distance is turned on. The user may display the screen for the adjustment setting for the recommended distance from the menu screen and turn the adjustment for the recommended distance on or off. When the adjustment setting for the recommended distance is turned on, the system control unit 50 adjusts the recommended distance on the basis of a user operation.

FIG. 6 shows an example of a setting screen for an adjustment setting for a recommended distance. By checking a check box 602 for "recommended distance adjustment," the user is enabled to turn an adjustment setting for a recommended distance on. Conversely, by unchecking the check box 602, the user is enabled to turn the adjustment setting for the recommended distance off.

In step S504, the system control unit 50 may determine whether the adjustment setting for the recommended distance is turned on, on the basis of a value set on the setting screen illustrated in FIG. 6. When the adjustment setting for the recommended distance is turned on, the processing proceeds to step S505. When the adjustment setting for the recommended distance is turned off, the processing proceeds to step S507.

In step S505, the system control unit 50 acquires an adjustment value to adjust the recommended distance. The adjustment of the recommended distance refers to processing to adjust the recommended distance acquired in step S502. The recommended distance is a value set in advance on the basis of an assumed model. Therefore, the three-dimensional effect perceived when viewing on a display device such as an HMD may differ from the three-dimensional effect assumed during photographing depending on the user. In view of this, the camera 100 may have a unit that enables the user to adjust the recommended distance.

FIG. 6 shows an example of a setting screen for setting an adjustment value to adjust a recommended distance. By moving a handle 604 to the + side using a slider 603 to change an adjustment value, the user is enabled to provide an instruction to increase a recommended distance. In this case, the system control unit 50 adjusts the recommended distance by multiplying the recommended distance by a coefficient $\alpha 1$ ($\alpha 1>1$) corresponding to the scale of the slider 603, which serves as the adjustment value. Conversely, by moving the handle 604 to the − side, the user is enabled to provide an instruction to decrease the recommended distance. In this case, the system control unit 50 adjusts the recommended distance by multiplying the recommended distance by a coefficient $\alpha 2$ ($0<\alpha 2<1$) corresponding to the scale of the slider 603, which serves as the adjustment value. Note that the adjustment value for the recommended distance may be set, while the user views a captured image displayed on a display device such as an HMD.

Figure 7:
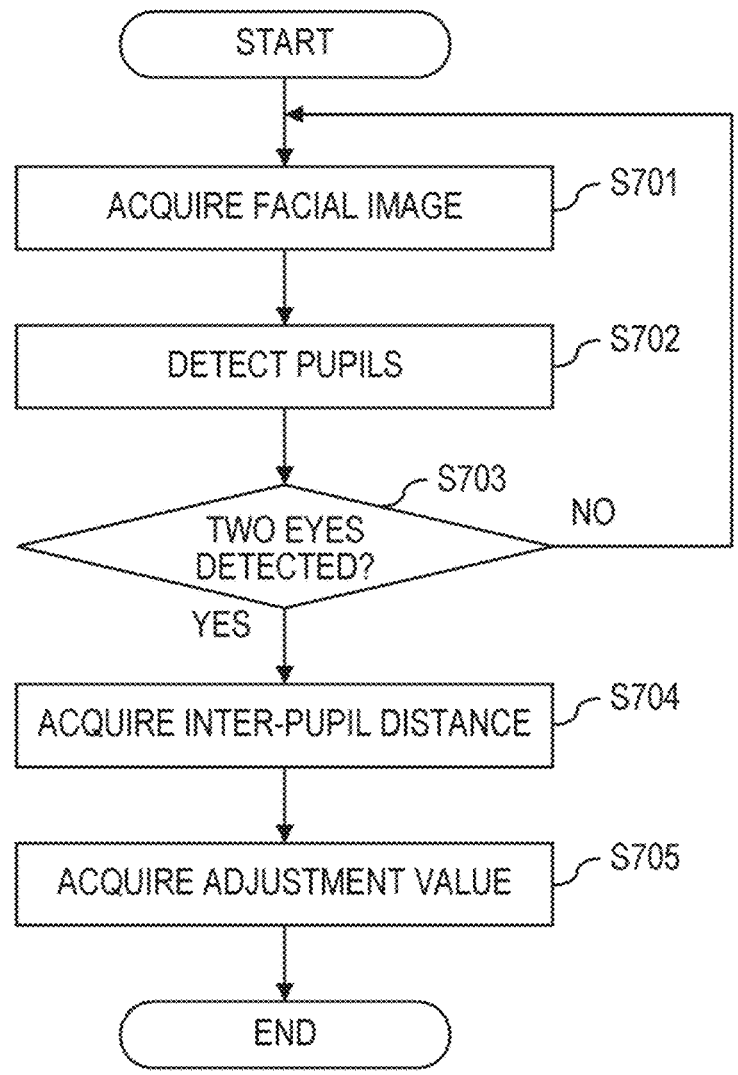
FIG. 7 is a flowchart illustrating setting processing for an adjustment value according to the first embodiment.

Further, the adjustment value may be automatically set on the basis of the distance between the pupils acquired from a user's facial image. FIG. 7 is a flowchart illustrating processing to set an adjustment value for a recommended distance. In step S701, the system control unit 50 acquires a user's facial image. For example, the user's facial image is one captured using a monocular lens provided in the camera 100, rather than the lens unit 300 with the two optical systems. Further, the user's facial image may also be one captured in advance with a monocular lens unit attached to the camera 100.

In step S702, the system control unit 50 detects the pupils from the user's facial image acquired in step S701 and acquires the central coordinates of each of the detected pupils. The system control unit 50 is enabled to detect the pupils using a known detection method. In step S702, it is sufficient to acquire the central coordinates of each of the pupils detected from the user's facial image. The system control unit 50 may use any detection method.

In step S703, the system control unit 50 determines whether the number of pupils detected in step S702 is two. When two pupils are detected, the processing proceeds to step S704. When less than two pupils or at least three pupils are detected, the facial image is considered invalid. Therefore, the system control unit 50 returns to step S701 to acquire another facial image.

In step S704, the system control unit 50 acquires an inter-pupil distance on the basis of information on the coordinates of the two pupils detected in step S702. The system control unit 50 is enabled to calculate the inter-pupil distance using the following Formulae 3 and 4.

Inter-pupil distance on image plane=Inter-coordinate distance between two pupils×Pixel size   Formula 3

Inter-pupil distance=Inter-pupil distance on image plane×Subject distance/Focal length   Formula 4

The pixel size in Formula 3 represents a value corresponding to the size per pixel of an imaging element. The object distance in Formula 4 may be calculated, for example, on the basis of the position of the focus ring of a lens during the capturing of a facial image. The focal length represents the focal length of a lens during the capturing of a facial image. When distortion is significant due to lens distortion aberrations or the like, the system control unit 50 is enabled to improve the accuracy of calculation results by calculating the inter-pupil distance while considering the distortion.

In step S705, the system control unit 50 acquires an adjustment value. The system control unit 50 is enabled to acquire an adjustment value α3 using the following Formula 5, on the basis of the inter-pupil distance acquired in step S704 and a reference inter-pupil distance.

α3=Reference inter-pupil distance/Inter-pupil distance acquired in step S704   Formula 5

The system control unit 50 stores the acquired adjustment value α3 in the memory 215 or the like.

As described above, in step S505 of FIG. 5, the system control unit 50 is enabled to acquire the adjustment values (for example, the coefficients α1 and α2) set by the user or the adjustment value α3 that is automatically set.

In step S506, the system control unit 50 adjusts the recommended distance using the adjustment values acquired in step S505. For example, the system control unit 50 adjusts the recommended distance using the adjustment value (the coefficient α1 or α2) acquired on the basis of a user's instruction on the setting screen shown in FIG. 6. Specifically, the system control unit 50 is enabled to adjust the recommended distance by multiplying the recommended distance by the coefficient α1 or α2.

Further, the system control unit 50 may adjust the recommended distance using an adjustment value acquired on the basis of a user's inter-pupil distance. Specifically, the system control unit 50 is enabled to adjust the recommended distance by multiplying the recommended distance by the adjustment value α3 acquired using Formula 5. In other words, the system control unit 50 is enabled to adjust the recommended distance to be longer on the basis of the adjustment value α3 when the inter-pupil distance acquired in step S704 of FIG. 7 is shorter than the assumed reference inter-pupil distance. Conversely, the system control unit 50 is enabled to adjust the recommended distance to be shorter on the basis of the adjustment value α3 when the inter-pupil distance acquired in step S704 in FIG. 7 is longer than the assumed reference inter-pupil distance.

With reference to FIGS. 1A and 1C, the recommended distance will be described for both the case where the user's inter-pupil distance is longer than the reference inter-pupil distance and the case where the user's inter-pupil distance is shorter than the reference inter-pupil distance. The distance between the left and right eyes shown in FIG. 1A is assumed to be the reference inter-pupil distance. The convergence angle S1 is assumed to be the minimum angle at which the object is viewable in three dimensions. The convergence angle S3 in FIG. 1C is approximately the same as the convergence angle S1, and the recommended distance is the distance from the camera to the object in FIG. 1C.

When the user's inter-pupil distance acquired in step S704 in FIG. 7 is shorter than the reference inter-pupil distance in FIG. 1A, the minimum angle at which the object is viewable in three dimensions becomes smaller than the convergence angle S1. Because the convergence angle S3 in FIG. 1C becomes smaller, the recommended distance from the camera 100 to the object increases. On the other hand, when the user's inter-pupil distance acquired in step S704 in FIG. 7 is longer than the reference inter-pupil distance in FIG. 1A, the minimum angle at which the object is viewable in three dimensions becomes larger than the convergence angle S1. Because the convergence angle S3 in FIG. 1C becomes larger, the recommended distance from the camera 100 to the object decreases.

In step S507, the system control unit 50 compares the object distance with the recommended distance acquired in step S502. When it is determined in step S504 that the adjustment setting for the recommended distance is turned on and the recommended distance is adjusted in step S506, the system control unit 50 compares the adjusted recommended distance with the object distance.

In step S508, the system control unit 50 displays a guide on the display unit 108 on the basis of the relationship between the object distance and the recommended distance compared in step S507. With reference to FIGS. 8A to 8C, FIGS. 9A to 9D, and FIGS. 10A to 10D, a display example of a guide will be described.

Figure 8A:
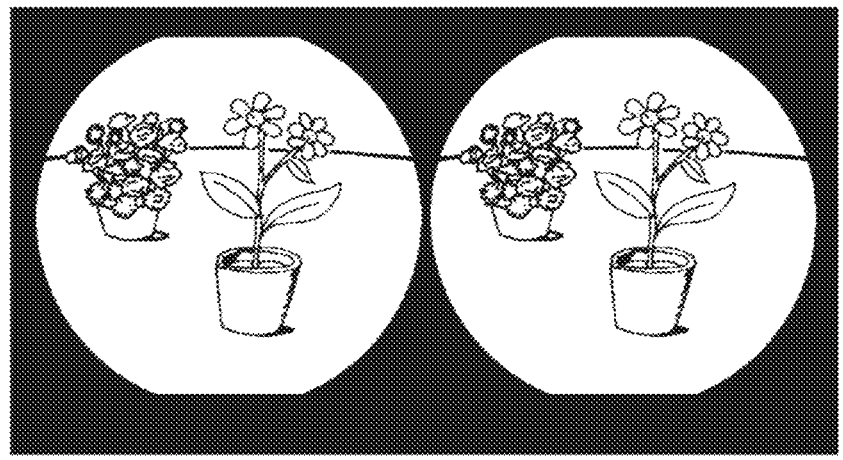
FIGS. 8A to 8C are diagrams describing display examples of a guide using image tinge.
Figure 8B:
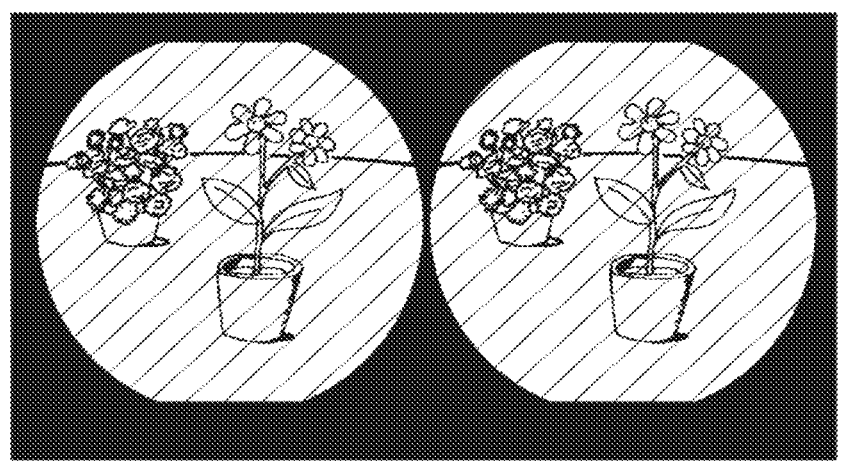
Figure 8C:
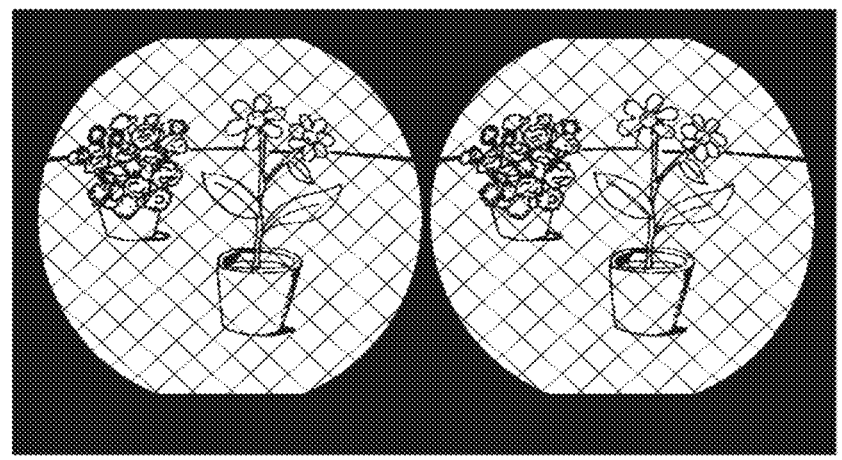

FIGS. 8A to 8C are diagrams describing a display example of a guide that shows the relationship between a recommended distance and an object distance using image tinge. The display unit 108 performs a live-view display in real time, showing a captured image that contains two image regions captured by the two optical systems 301R and 301L of the lens unit 300. The display unit 108 controls coloring of the two image regions on the basis of the relationship between a recommended distance and an object distance.

FIG. 8A shows a state where the object distance substantially matches the recommended distance. When the object distance substantially matches the recommended distance, the display unit 108 does not perform any special display. In addition, when recommended distance information shows a range from the shortest value to the longest value of the recommended distance and the object distance falls within the range, the display unit 108 does not also perform any special display as shown in FIG. 8A.

FIG. 8B shows a state where the object distance is longer than the recommended distance. When the object distance is longer than the recommended distance, the display unit 108 displays, for example, the tinge of a live-view image, which represents an image in a live-view display, in a warm color. The oblique lines in the live-view image in FIG. 8B show that the image is colored with a warm color. In addition, when the recommended distance information shows the range from the shortest value to the longest value of the recommended distance and the object distance is longer than the longest value of the range, the display unit 108 also displays the tinge of the live-view image in a warm color as shown in FIG. 8B.

FIG. 8C shows a state where the object distance is shorter than the recommended distance. When the object distance is shorter than the recommended distance, the display unit 108 display, for example, the tinge of the live-view image in a cold color. The hatching of the live-view image in FIG. 8C shows that the image is colored with a cold color. In addition, when the recommended distance information shows the range from the shortest value to the longest value and the object distance is shorter than the shortest value of the range, the display unit 108 displays the tinge of the live-view image in a cold color as shown in FIG. 8C.

The display unit 108 changes the tinge of a display image on the basis of whether an object distance is long or short relative to a recommended distance, thereby making it possible to notify the user acting as a photographer of whether the object distance matches the recommended distance. The color showing whether the object distance matches the recommended distance is not limited to examples of warm colors and cold colors but may include other colors, provided that the user is enabled to recognize the relationship between the object distance and the recommended distance.

In the examples of FIGS. 8A to 8C, the user is enabled to recognize the relationship between the object distance and the recommended distance through differences in the tinge of the live-view image. By moving closer to or farther away from the object according to the relationship between the object distance and the recommended distance, the user may adjust a photographing position to enable photographing at the recommended distance at which the object is displayed to be viewable in three dimensions.

FIGS. 9A to 9D are diagrams describing display examples of a guide that shows the positional relationship between a recommended distance, an object, and the camera 100. The display unit 108 performs the live-view display of two image regions and controls, as a guide to show the relationship between an object distance and a recommended distance, the display of a graphic (item) that shows the positional relationship between the recommended distance, the object, and the camera 100.

Figure 9A:
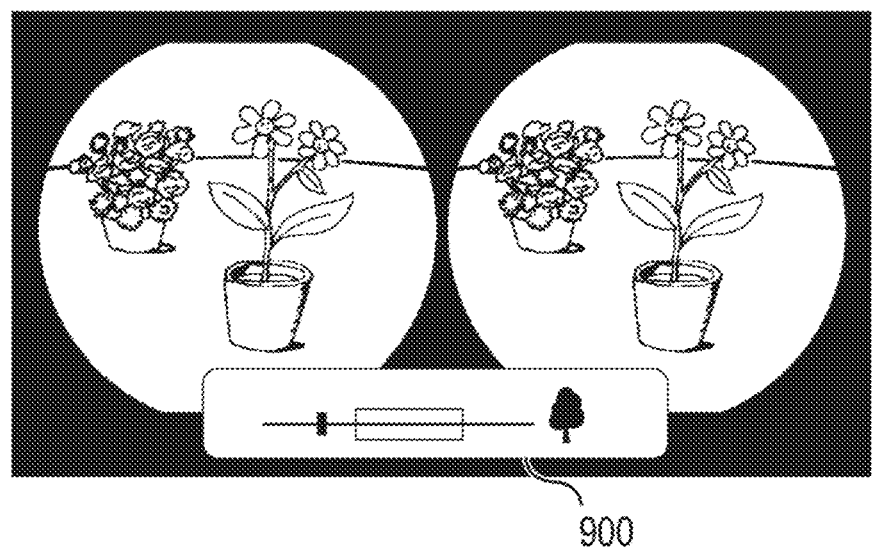
FIGS. 9A to 9D are diagrams describing display examples of a guide that shows a positional relationship.
Figure 9B:
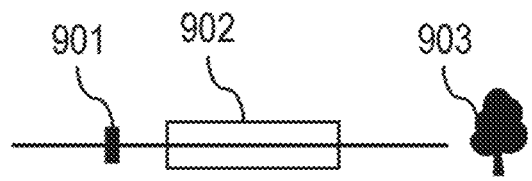
Figure 9C:
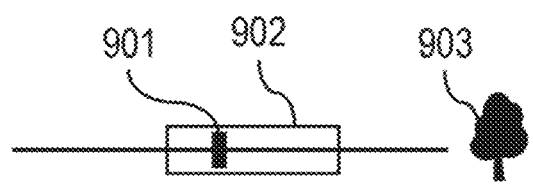
Figure 9D:
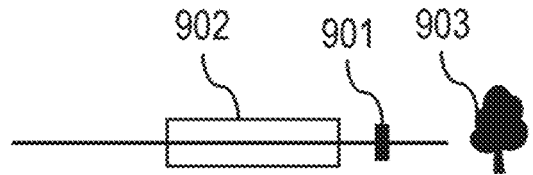

In the example of FIG. 9A, the guide that shows the relationship between the object distance and the recommended distance is displayed, for example, in a display area 900 at the lower part of a live-view image. With reference to FIGS. 9B to 9D, specific examples of the guide that shows the relationship between the object distance and the recommended distance will be described. In FIGS. 9B to 9D, the recommended distance is shown by a range from the shortest value to the longest value of the recommended distance, but it may also be shown by the position of the longest value of the recommended distance.

FIG. 9B shows an example of the guide when the object distance is longer than the recommended distance. A position 901 of the camera 100 is displayed at a position farther from an object 903 than a range 902 of the recommended distance. The object distance refers to the distance from the position 901 of the camera 100 to the object 903. The recommended distance refers to the distance from the position 901 of the camera 100 to any position within the range 902 of the recommended distance. From the guide shown in FIG. 9B, the user is enabled to recognize that the object distance is longer than the recommended distance.

FIG. 9C shows an example of the guide when the object distance substantially matches the recommended distance or when the object distance falls within the range 902 of the recommended distance. The position 901 of the camera 100 is displayed within the range 902 of the recommended distance. From the guide shown in FIG. 9C, the user is enabled to recognize that the object distance falls within the range 902 of the recommended distance.

FIG. 9D shows an example of the guide when the object distance is shorter than the recommended distance. The position 901 of the camera 100 is displayed at a position closer to the object 903 than the range 902 of the recommended distance. From the guide shown in FIG. 9D, the user is enabled to recognize that the object distance is shorter than the recommended distance.

Figures 10A, 10B, 10C, 10D:
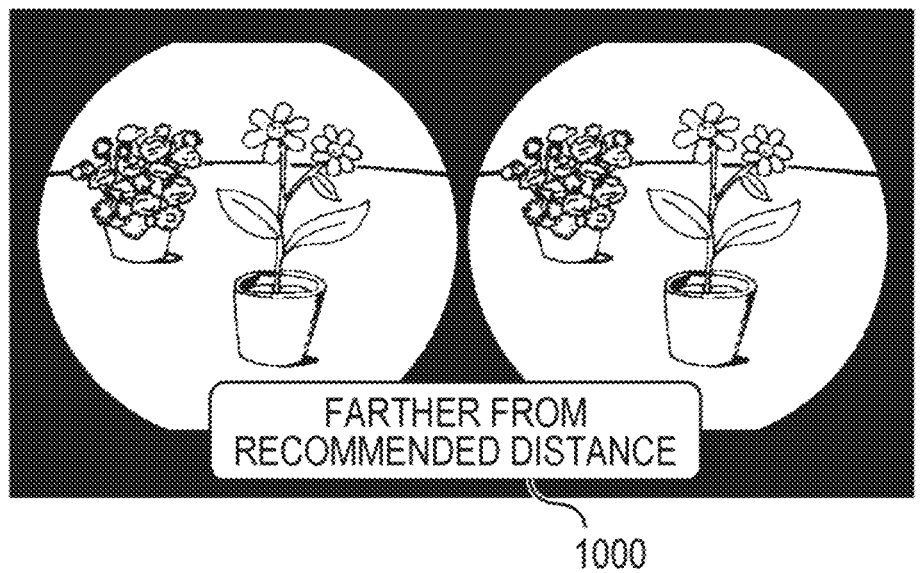
FIGS. 10A to 10D are diagrams describing display examples of a guide using text.

FIGS. 10A to 10D are diagrams describing display examples of a guide that shows the relationship between a recommended distance and an object distance through text (text information). The display unit 108 performs the live-view display of two image regions and controls the display of text that shows the relationship between an object distance and a recommended distance. In the example of FIG. 10A, the text that shows the relationship between the object distance and the recommended distance is displayed, for example, in a display area 1000 at the lower part of a live-view image. With reference to FIGS. 10B to 10D, specific examples of the text that shows the relationship between the object distance and the recommended distance will be described.

FIG. 10B shows an example of the text displayed when the object distance is longer than the recommended distance. The text shows that the position of the camera 100 is farther from an object than the position of the recommended distance or the range of the recommended distance. FIG. 10C shows an example of the text displayed when the object distance substantially matches the recommended distance or when the object distance falls within the range of the recommended distance. The text shows that the position of the camera 100 substantially matches the position of the recommended distance or falls within the range of the recommended distance. FIG. 10D shows an example of the text displayed when the object distance is shorter than the recommended distance. The text shows that the position of the camera 100 is closer to the object than the position of the recommended distance or the range of the recommended distance. By displaying the text described in FIGS. 10B to 10D on the live-view image, the user is enabled to recognize the relationship between the recommended distance and the object distance.

The display examples of the guide are not limited to those described in FIGS. 8A to 8C, FIGS. 9A to 9D, and FIGS. 10A to 10D. However, other methods may be employed, provided that the user acting as a photographer is enabled to recognize the relationship between the object distance and the recommended distance.

According to the above first embodiment, the camera 100 performs a guide display to notify the user of the relationship between a recommended distance and an object distance. As a result, the user is enabled to easily capture an image that is viewable in three dimensions on a display device.

Second Embodiment

The first embodiment describes an example of notifying the user of the relationship between the distance from the camera 100 to a specific object and a recommended distance. In a second embodiment, a distance map is generated for each of two image regions, and the relationship between a recommended distance and an object distance is notified to the user for each region (block) within the image regions. The image regions may be divided into blocks on the basis of the relationship between the recommended distance and the object distance.

Figure 11:
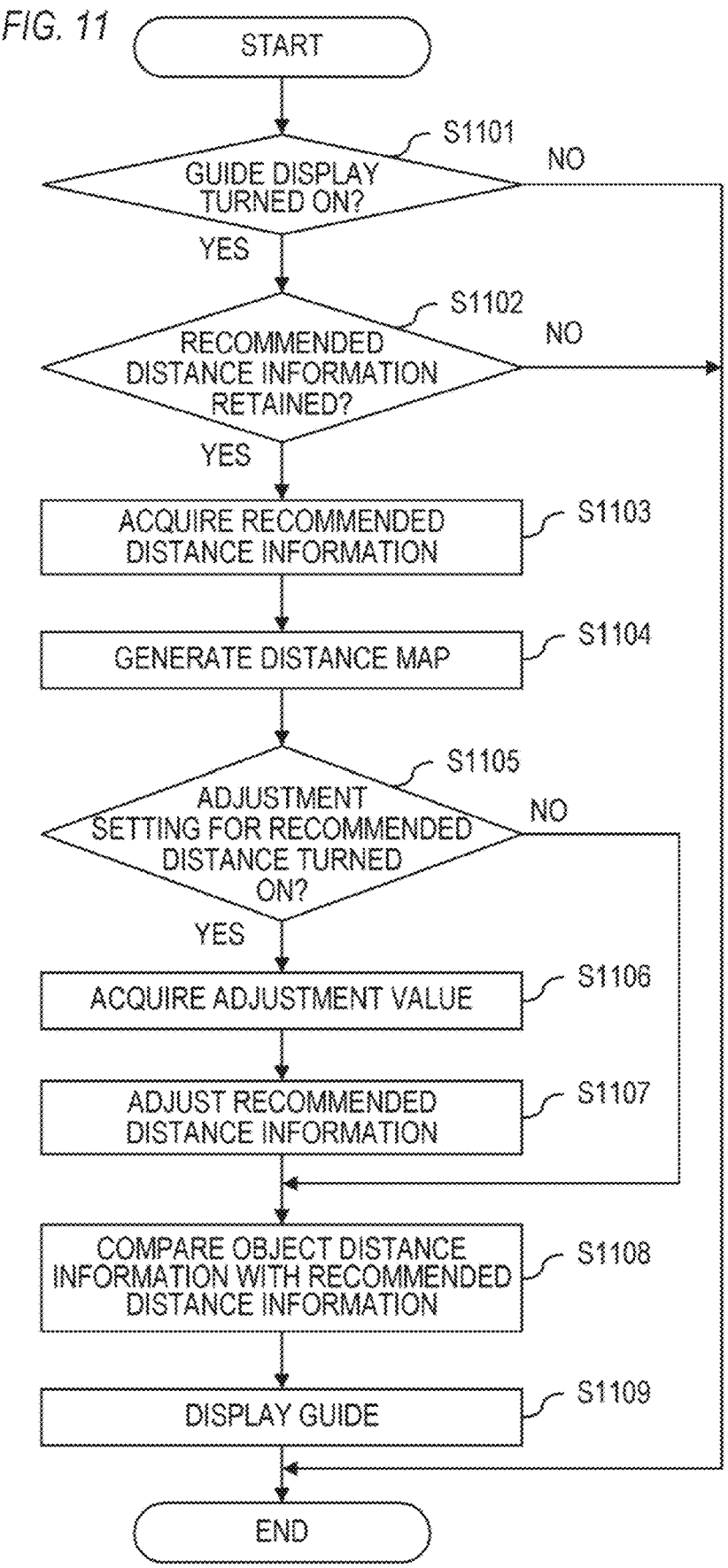
FIG. 11 is a flowchart illustrating guide display processing according to a second embodiment.

With reference to FIG. 11, guide display processing according to the second embodiment will be described. For the same processing as the guide display processing according to the first embodiment in FIG. 5, detailed descriptions will be omitted.

In step S1101, the system control unit 50 determines whether a display setting for a guide, which notifies the user whether a captured image is capable of being displayed for three-dimension viewing on a display device such as an HMD, is turned on. The processing in step S1101 is the same as that in step S501 in FIG. 5, and therefore its detailed description will be omitted. When the display setting for the guide is turned on, the processing proceeds to step S1102. When the display setting for the guide is turned off, the processing shown in FIG. 11 ends.

In step S1102, the system control unit 50 determines whether recommended distance information on the lens unit 300 attached to the camera 100 is retained in the non-volatile memory 219 of the camera 100. The recommend distance information is retained, for example, in a recommended distance information table illustrated in FIG. 12.

FIG. 12 is a diagram illustrating the recommended distance information table. A recommended distance differs for each type of lens unit 300. The recommended distance information table retains information on the shortest value and the longest value of the recommended distance for each lens ID, which shows the type of a lens unit used for photographing. For example, in the lens unit 300 with lens ID "001," the shortest value of the recommended distance of the lens unit 300 is "x1," and the longest value thereof is "x2." By referring to the recommended distance information table, the system control unit 50 is enabled to acquire the recommended distance information corresponding to the lens ID of the lens unit 300 attached to the camera 100.

In step S1102, the system control unit 50 is enabled to determine that the recommended distance information on the lens unit 300 is retained when the lens ID of the lens unit 300 attached to the camera 100 during photographing exists in the recommended distance information table. When the recommended distance information on the lens unit 300 is retained, the processing proceeds to step S1103. When the recommended distance information on the lens unit 300 is not retained, the processing shown in FIG. 11 ends.

In step S1103, the system control unit 50 acquires the recommended distance information corresponding to the lens unit 300 attached to the camera 100. The system control unit 50 is enabled to acquire the recommended distance information from the recommended distance information table. When the recommended distance information is retained inside the camera 100, the system control unit 50 is enabled to acquire the recommended distance information without receiving it from the lens unit 300.

In step S1104, the system control unit 50 generates a distance map (object distance map) that shows object distance information for the entire captured image. By capturing an image using the binocular lens unit 300, the system control unit 50 is enabled to generate the distance map for the entire captured image through distance calculations with a stereo camera. The method of the distance calculations with the stereo camera is a known technology, and therefore its detailed description will be omitted.

The system control unit 50 is able to calculate an object distance, for example, using the following Formula 6. W represents the baseline length between left and right lenses, F represents a focal length, and D represents parallax.

$$\text{Subject distance } L = W \times F / D \quad \text{Formula 6}$$

The system control unit 50 performs calculations using Formula 6 on the entire captured image. Parallax information is calculable in regions where object information such as edges exist, but it is not obtainable in flat areas of the captured image. Therefore, by interpolating distance information in the flat areas using ambient distance information, the system control unit 50 is enabled to generate a distance map for the entire captured image.

The method for generating the distance map is not limited to distance calculations using the stereo camera. For example, when the imaging unit 211 has an imaging-plane phase difference sensor, the system control unit 50 may generate the distance map for a captured image on the basis of phase difference information output from the imaging-plane phase difference sensor. Further, when the camera 100 has a distance measurement sensor such as a time of flight (TOF) sensor, the system control unit 50 may generate the distance map for a captured image on the basis of output from the sensor.

Figure 15A:
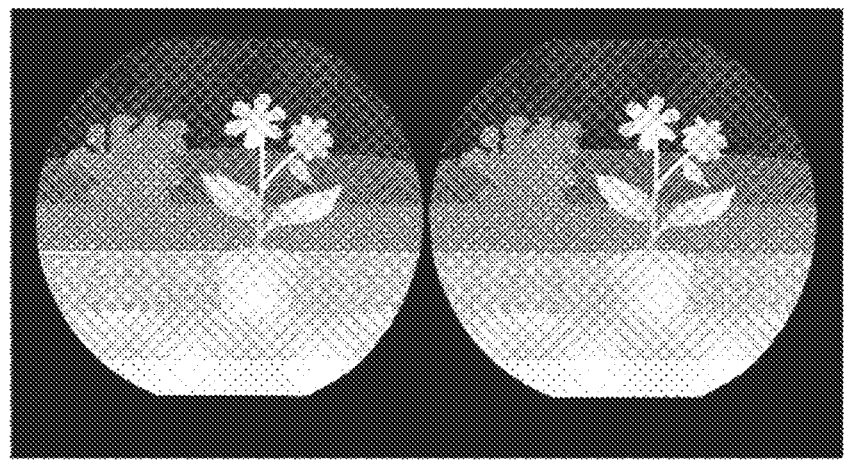
FIG. 15A is a diagram showing an example of a distance map.

FIG. 15A is a diagram showing an example of a distance map. Each of two image regions retains distance information, and a distance map refers to an image diagram where each image region is represented by shading on the basis of the value of an object distance in order to visualize the distance information.

In step S1105, the system control unit 50 determines whether an adjustment setting for the recommended distance is turned on. The processing in step S1105 is the same as that in step S504 in FIG. 5, and therefore its detailed description will be omitted.

In step S1106, the system control unit 50 acquires an adjustment value to adjust the recommended distance. The system control unit 50 may acquire the adjustment value for the recommended distance using a user's inter-pupil distance acquired from the external device. FIG. 13 is a flowchart illustrating processing to set an adjustment value for a recommended distance.

In step S1301, the system control unit 50 connects to the external device. The external device refers to, for example, an HMD. FIG. 14 is a diagram describing the connection between the camera 100 and an HMD 400 according to the second embodiment. The camera 100 is connected to the HMD 400, for example, via a wireless connection. Note that the camera 100 may also be connected to the HMD 400 via a wired connection. The system control unit 50 is wirelessly connected to the HMD 400 through the communication unit 221 and enables the transmission and reception of various data between the camera 100 and the HMD 400.

In step S1302, the system control unit 50 acquires an inter-pupil distance from the HMD 400 that serves as the external device. The HMD 400 includes a camera that captures images of the eyes to detect the user's lines of sight and is capable of measuring the user's inter-pupil distance using the captured images of the eyes. The HMD 400 transmits the acquired inter-pupil distance to the camera 100. As a result, the camera 100 is enabled to acquire the inter-pupil distance from the HMD 400.

In step S1303, the system control unit 50 acquires an adjustment value $\alpha 3$ using Formula 5 like step S705 in FIG. 7, on the basis of the inter-pupil distance acquired in step S1302. Note that the external device is not limited to the HMD 400 but may include other device if the device is capable of capturing a user's facial image and measuring the inter-pupil distance. Further, the system control unit 50 may also acquire the adjustment value calculated by the external device using the inter-pupil distance.

Note that in step S1106 of the second embodiment, an example is provided where the adjustment value is acquired on the basis of the information from the external device. However, the adjustment value may also be acquired by the camera 100 in the same manner as in the first embodiment. Further, in step S505 of the first embodiment, an example is provided where the camera 100 acquires the adjustment value. However, the adjustment value in the first embodiment may also be acquired on the basis of information from the external device as in the second embodiment.

In step S1107 of FIG. 11, the system control unit 50 adjusts the recommended distance using the adjustment value acquired in step S1106. The processing in step S1107 is the same as that in step S506 in FIG. 5, and therefore its detailed description will be omitted.

In step S1108, the system control unit 50 compares the distance map generated in step S1104 with the recommended distance acquired in step S1103. On the basis of the comparison result, the system control unit 50 generates a comparison map that shows the size relationship between the object distance and the recommended distance for each region (block). When it is determined in step S1105 that the adjustment setting for the recommended distance is turned on and the recommended distance is adjusted in step S1107, the system control unit 50 generates the comparison map using the adjusted recommended distance.

Figure 15B:
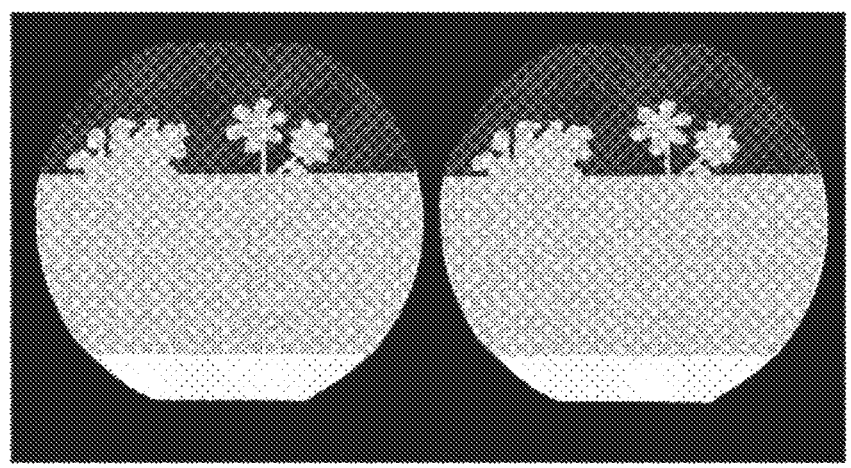
FIG. 15B is a diagram showing an example of a comparison map.

FIG. 15B is a diagram showing an example of a comparison map. A comparison map refers to an image diagram where blocks farther from a recommended distance, blocks at the recommended distance, and blocks closer than the recommended distance are distinguished by color shading. Note that when recommended distance information falls within the range of the recommended distance, in one embodiment, the system control unit 50 only needs to generate a comparison map where blocks farther from the longest value of the recommended distance, blocks falling within the range of the recommended distance, and blocks closer than the shortest value of the recommended distance are distinguished by color shading.

In step S1109, the system control unit 50 displays the captured image on the display unit 108 to show the relationship between the recommended distance and the object distance, on the basis of the comparison map generated in step S1108.

Figure 15C:
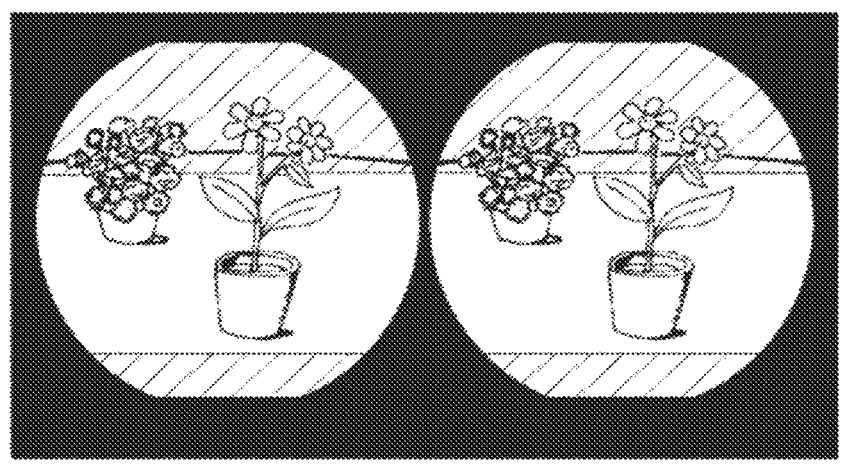
FIG. 15C is a diagram showing an example of guide display.

FIG. 15C is a diagram showing an example of a guide display for a captured image containing two image regions. In the example of FIG. 15C, blocks farther from a recommended distance and blocks closer than the recommended distance are represented by oblique lines. Each block may be colored with a different color on the basis of the relationship between the recommended distance and an object distance. The user acting as a photographer is enabled to recognize whether the object distance matches the recommended distance for each block on the basis of differences in display modes such as oblique lines and coloring of each block. By moving closer to or farther away from an object according to a guide display as shown in FIG. 15C, the user is enabled to adjust a photographing position to include the desired object within blocks at the recommended distance.

According to the above second embodiment, the camera 100 generates a distance map for a captured image containing two image regions, enabling the user to be notified of the relationship between a recommended distance and an object distance for each block (region) within the image regions. As a result, the user is enabled to easily adjust a photographing distance so that a desired object is displayed to be viewable in three dimensions on a display device.

Note that the above embodiments are provided as examples only, and configurations obtained by appropriately modifying or changing the configurations of the above embodiments within the scope of the present disclosure are also included in the present disclosure. Configurations obtained by appropriately combining the configurations of the above embodiments together are also included in the present disclosure.

According to the present disclosure, it is possible to provide an imaging device that is capable of easily capturing images viewable in three dimensions when capturing two image regions with parallax.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-210898, filed on Dec. 14, 2023, which is hereby incorporated by reference herein in its entirety.

What is claimed is:

1. An electronic device comprising:
a processor; and
a memory storing a program which, when executed by the processor, causes the electronic device to:
execute acquisition processing to acquire information on a distance from an imaging device to an object;
execute control processing to control notification of a relationship between a recommended distance and the distance from the imaging device to the object, the recommended distance representing a photographing distance that enables three-dimensional viewing of a captured image containing two image regions with parallax relative to each other;
execute setting processing to set whether to display information showing the relationship between the recommended distance and the distance from the imaging device to the object; and
execute adjustment processing to adjust the recommended distance,
wherein the information on the recommended distance is adjusted based on an inter-pupil distance of a user, and
wherein the recommended distance is adjusted to be longer in a case where the inter-pupil distance is shorter than a reference value for the inter-pupil distance and the recommended distance is adjusted to be shorter in a case where the inter-pupil distance is longer than the reference value.

2. The electronic device according to claim 1, wherein the information on the distance from the imaging device to the object is acquired based on a focal length of the imaging device.

3. The electronic device according to claim 1, wherein the information on the distance from the imaging device to the object is acquired based on the parallax between the two image regions.

4. The electronic device according to claim 1, wherein the information on the distance from the imaging device to the object is acquired based on phase difference information output from an image-plane phase difference sensor of the imaging device.

5. The electronic device according to claim 1, wherein the information on the distance from the imaging device to the object is acquired based on output from a time of flight (TOF) sensor of the imaging device.

6. The electronic device according to claim 1, wherein the processor, further causes the electronic device to:
execute second acquisition processing to acquire information on the recommended distance.

7. The electronic device according to claim 6, wherein the information on the recommended distance is acquired based on a baseline length representing a distance between two optical systems that capture the two image regions, respectively.

8. The electronic device according to claim 6, wherein the information on the recommended distance is acquired from a lens unit, which has two optical systems that respectively capture the two image regions and is attached to the imaging device.

9. The electronic device according to claim 6, wherein the information on the recommended distance that is retained in advance by the imaging device is acquired.

10. The electronic device according to claim 1, wherein the recommended distance is adjusted based on an instruction of a user.

11. The electronic device according to claim 1, wherein the information on the recommended distance includes a range of the photographing distance that enables the three-dimensional viewing of the captured image containing the two image regions.

12. The electronic device according to claim 1, wherein coloring of the two image regions is controlled based on the relationship between the recommended distance and the distance from the imaging device to the object.

13. The electronic device according to claim 1, wherein the control processing further executes control display of an item that shows a positional relationship between the recommended distance, the object, and the imaging device.

14. The electronic device according to claim 1, wherein the control processing further executes control display of text information that shows the relationship between the recommended distance and the distance from the imaging device to the object.

15. The electronic device according to claim 1, wherein notification of the relationship between the recommended distance and the distance from the imaging device to the object is controlled for each block within the two image regions.

16. A method for controlling an electronic device, the method comprising:
acquiring information on a distance from an imaging device to an object;
controlling notification of a relationship between a recommended distance and the distance from the imaging device to the object, the recommended distance representing a photographing distance that enables three-dimensional viewing of a captured image containing two image regions with parallax relative to each other;
setting whether to display information showing the relationship between the recommended distance and the distance from the imaging device to the object; and
adjusting the recommended distance,
wherein the information on the recommended distance is adjusted based on an inter-pupil distance of a user, and
wherein the recommended distance is adjusted to be longer in a case where the inter-pupil distance is shorter than a reference value for the inter-pupil distance and the recommended distance is adjusted to be shorter in a case where the inter-pupil distance is longer than the reference value.

17. A non-transitory computer-readable medium storing a program, wherein the program causes a computer to execute a method for controlling an electronic device, the method comprising:
acquiring information on a distance from an imaging device to an object;
controlling notification of a relationship between a recommended distance and the distance from the imaging device to the object, the recommended distance representing a photographing distance that enables three-dimensional viewing of a captured image containing two image regions with parallax relative to each other;
setting whether to display information showing the relationship between the recommended distance and the distance from the imaging device to the object; and
adjusting the recommended distance,
wherein the information on the recommended distance is adjusted based on an inter-pupil distance of a user, and
wherein the recommended distance is adjusted to be longer in a case where the inter-pupil distance is shorter than a reference value for the inter-pupil distance and the recommended distance is adjusted to be shorter in a case where the inter-pupil distance is longer than the reference value.

\* \* \* \* \*